(12) United States Patent
Abe et al.

(10) Patent No.: US 7,103,902 B2
(45) Date of Patent: Sep. 5, 2006

(54) INFORMATION RECORDING MEDIUM CARTRIDGE HAVING A PAIR OF MOVABLE SHUTTER MEMBERS

(75) Inventors: Yasuyuki Abe, Miyagi (JP); Shuichi Kikuchi, Miyagi (JP); Susumu Shibagaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 226 days.

(21) Appl. No.: 10/493,825

(22) PCT Filed: Oct. 3, 2003

(86) PCT No.: PCT/JP03/12719

§ 371 (c)(1),
(2), (4) Date: Apr. 28, 2004

(87) PCT Pub. No.: WO2004/044914

PCT Pub. Date: May 27, 2004

(65) Prior Publication Data

US 2004/0255314 A1 Dec. 16, 2004

(30) Foreign Application Priority Data

Nov. 13, 2002 (JP) ............................. 2002-329086

(51) Int. Cl.
*G11B 23/03* (2006.01)
(52) U.S. Cl. ...................... 720/743; 360/133
(58) Field of Classification Search ............... None
See application file for complete search history.

(56) References Cited

U.S. PATENT DOCUMENTS 4,652,961 A 3/1987 Dieffenbach 5,995,346 A * 11/1999 Schick et al. ............... 360/133
6,377,538 B1 4/2002 d'Alayer de Costemore d'Arc
6,826,145 B1 * 11/2004 Oishi et al. ................. 720/738
2001/0021083 A1 9/2001 Braken et al.

FOREIGN PATENT DOCUMENTS

| EP | 1 156 488 A2 | 11/2001 |
|---|---|---|
| JP | 61-057364 | 3/1986 |
| JP | 02-162275 | 6/1990 |
| JP | 11-003577 | 1/1999 |
| JP | 2002-50148 A | 2/2002 |

OTHER PUBLICATIONS

International Search Report dated Nov. 11, 2003.
Supplementary EPO Search Report dated Sep. 2, 2005.

* cited by examiner

*Primary Examiner*—David Davis
(74) *Attorney, Agent, or Firm*—Rader, Fishman & Grauer PLLC; Ronald P. Kananen

(57) ABSTRACT

A recording medium cartridge includes a disc, an inner rotor and a shutter in a shell. Torque is applied to the inner rotor by a coil spring to drive the shutter so as to maintain the closed state of an opening part provided in the shell. When the recording medium cartridge is inserted into a disc device, the inner rotor is rotated against the resilient force of the coil spring by a shutter opening mechanism provided in the disc recording and reproducing device. Thus, the shutter is moved to a position where the opening part provided in the shell is opened. When the cartridge is ejected from the disc device, the inner rotor is rotated by the resilient force of the coil spring to close the shutter.

8 Claims, 24 Drawing Sheets

INFORMATION RECORDING MEDIUM CARTRIDGE HAVING A PAIR OF MOVABLE SHUTTER MEMBERS

TECHNICAL FIELD

The present invention relates to a recording medium cartridge including a cartridge casing having upper and lower shells (upper and lower halves) in which a disc shaped information recording medium, such as an optical disc, a magneto-optical disc, a magnetic disc, etc., an inner rotor and a shutter are accommodated, wherein the inner rotor is rotated in one direction so that an opening part provided in at least one shell of the upper and lower shells of the cartridge casing is opened by the shutter. Particularly, the present invention relates to a recording medium cartridge in which the shutter can be easily and assuredly driven from a position where a recording/reproducing opening part and a central opening part are opened to a position where the recording/reproducing opening part and the central opening part are closed by using an extension coil spring or a compression coil spring shutter.

BACKGROUND ART

As shown in FIG. 30, a recording medium cartridge of a below-described type has been widely employed (for example, Japanese Patent Application Laid-Open No. hei 2-162275) as a recording medium cartridge 101. The recording medium cartridge 101 includes a disc 102, a shell (case) 103 in which the disc 102 is accommodated so as to rotate freely, a shutter 105 for opening and closing an opening part 104 for recording and reproducing data provided in the shell 103, and a shutter spring 106 for urging the shutter 105 to close the opening part 104. The shutter 105 is linearly moved relative to the shell 103 by the shutter spring 106 to open and close the opening part 104 for recording and reproducing data.

In the recording medium cartridge, the shutter 105 is linearly moved relative to the shell 103. Further, as shown in FIG. 31, a recording medium cartridge 201 of a type that a shutter 105 is rotated relative to a shell 103 to open and close an opening part 104 for recording and reproducing data has been developed (for example, Japanese Utility Model Application Laid-Open No. sho 61-57364).

In the recording medium cartridge 101 shown in FIG. 30, since the shutter 105 is moved linearly relative to the shell 103 to open and close the opening part 104 for recording and reproducing data, the opening part 104 for recording and reproducing data can be opened and closed with a small amount of movement. Accordingly, even when a torsion coil spring is employed for the shutter spring 106, the shutter 105 can be maintained assuredly in a closed state by the shutter spring 106.

On the contrary, in the recording medium cartridge 201 in which the shutter 105 is rotated relative to the shell 103 to open and close the opening part 104 for recording and reproducing data, when the spring force of a shutter spring 106 is exerted on the outer peripheral side of the shutter 105 to rotate the shutter 105 throughout a wide angle, the torsion coil spring as the shutter spring 106 is brought into what is called a completely opened state, as shown in FIG. 31, so that a resiliency is weakened. Thus, the shutter 105 is hardly maintained assuredly in a closed state.

The present invention provides a recording medium cartridge of a type that a shutter is rotated relative to a shell to open and close an opening part for recording and reproducing data in which the shutter can maintain assuredly the opening part for recording and reproducing data in a closed state.

DISCLOSURE OF THE INVENTION

The invention defined in claim 1 concerns a recording medium cartridge comprising: a cartridge casing composed of upper and lower shells having an information recording medium, an inner rotor and a shutter accommodated therein, a recording/reproducing opening part for allowing one part of the information recording medium to diametrically face at least one shell of the upper and lower shells of the cartridge casing; and a central opening part for driving the information recording medium. The inner rotor is rotated in one direction to drive the shutter and open the recording/reproducing opening part and the central opening part. The shutter is driven from a position where the recording/reproducing opening part and the central opening part are opened to a position where the recording/reproducing opening part and the central opening part are closed by rotating the inner rotor to the other direction by an extension coil spring or a compression coil spring.

Thus, the shutter is driven to open the recording/reproducing opening part and the central opening part by a shutter opening mechanism provided in a disc recording and reproducing device for recording and/or reproducing data in the recording medium cartridge. The shutter is simply and assuredly driven from the position where the recording/reproducing opening part and the central opening part are opened to the position where the recording/reproducing opening part and the central opening part are closed by rotating the inner rotor to the other direction by the extension coil spring or the compression coil spring. Further, the shutter can be kept closed by the resilient force of the coil spring.

The invention defined in claim 2 concerns a recording medium cartridge according to claim 1, wherein the extension coil spring or the compression coil spring is arranged so as to be wound on the outer peripheral part of the inner rotor, one end part is engaged with the inner rotor and the other end part is engaged with the cartridge casing.

Thus, the shutter is driven to open the recording/reproducing opening part and the central opening part by rotating the inner rotor against the resilient force of the extension coil spring or the compression spring by the shutter opening mechanism provided in the disc recording and reproducing device. The shutter is driven to close the recording/reproducing opening part and the central opening part by rotating the inner rotor under the resilient force of the extension coil spring or the compression coil spring accumulated by the rotation of the inner rotor.

The invention defined in claim 3 concerns a recording medium cartridge according to claim 1, wherein the extension coil spring or the compression coil spring has a wire diameter of 0.2 mm or smaller and a coil diameter of 1.5 mm or smaller.

Thus, the extension coil spring or the compression coil spring can be arranged in a narrow space between the shell and the inner rotor.

The invention defined in claim 4 concerns a recording medium cartridge according to claim 1, wherein the extension coil spring or the compression coil spring is formed in a curved form corresponding to the curvature of the outer peripheral part of the inner rotor.

Thus, the extension coil spring or the compression coil spring is easily attached to the outer peripheral part of the inner rotor.

An information recording medium cartridge defined in claim 5 concerns an information recording medium cartridge according to claim 1, wherein when the recording medium cartridge is inserted into a disc recording and reproducing device, the inner rotor is rotated against the resilient force of the coil spring by a shutter opening mechanism provided in the disc recording and reproducing device to move a pair of shutter members of the shutter to a second position where the opening parts provided in the cartridge casing are opened.

Thus, after recording and reproducing operations are finished on the recording medium cartridge, when the recording medium cartridge is ejected from the disc recording and reproducing device, the inner rotor is returned and rotated by the resilient force of the coil spring to return and move a pair of shutter members of the shutter to a first position where the opening parts provided in the cartridge casing are opened.

An information recording medium cartridge defined in claim 6 concerns an information recording medium cartridge according to claim 1, wherein an engaging part at one end of the coil spring is engaged with a boss shaped spring engaging part protruding on the inner surface of the cartridge casing and an end part of the spring engaging part is provided with an engaging part slip preventing flange part.

Thus, the engaging part at one end of the coil spring is prevented from slipping from the boss shaped spring engaging part by the engaging part slip preventing flange part.

An information recording medium cartridge defined in claim 7 concerns an information recording medium cartridge according to claim 1, wherein an engaging part at the other end of the coil spring is engaged with a hook shaped spring engaging part provided in a coil spring attaching part of the inner rotor.

Thus, the engaging part at the other end of the coil spring can be easily and assuredly engaged with the inner rotor side.

An information recording medium cartridge defined in claim 8 concerns an information recording medium cartridge according to 1, wherein the coil spring attaching part is formed by recessing the end part of a ring side of the outer peripheral surface of the inner rotor in an annular form so that the outer peripheral part of the attached coil spring maintains a non-contact state with the cartridge casing.

Thus, the outer peripheral part of the coil spring is prevented from protruding from the outer peripheral surface of the ring part of the inner rotor to prevent the coil spring from coming into contact with (interfering with) the cartridge casing

BEST MODE FOR CARRYING OUT THE INVENTION

Now, the description of a recording medium cartridge of the present invention is classified into the items of (1) schematic structure of recording medium cartridge and structure of shutter spring, (2) structure of cartridge casing, (3) structure of information recording medium, (4) structure of inner rotor, (5) structure of shutter, (6) operation and (7) other embodiments. The items will be described in order.

Figure 1:
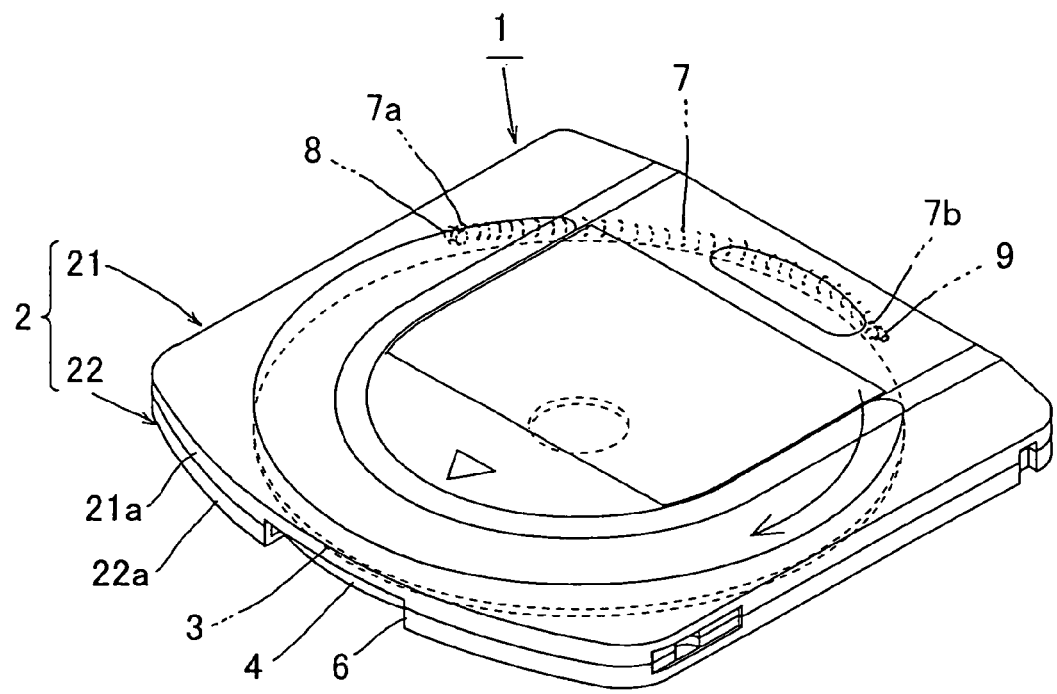
FIG. 1 is a perspective view showing a recording medium cartridge viewed from an upper surface side.
Figure 2:
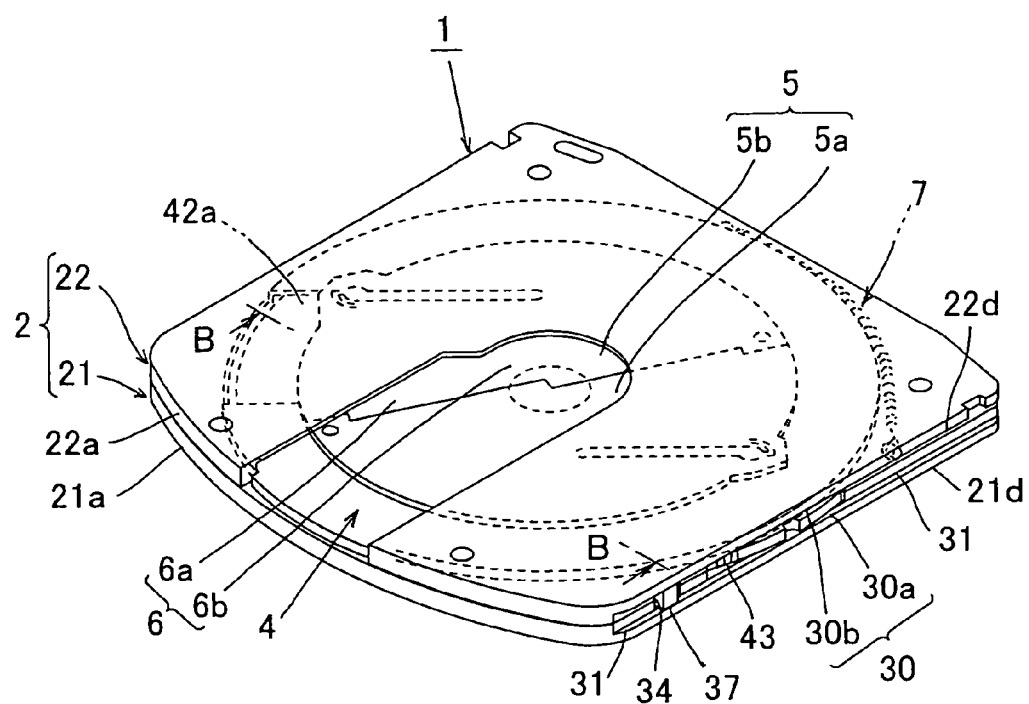
FIG. 2 is a perspective view showing the recording medium cartridge viewed from a lower surface side (a shutter closing state).
Figure 3:
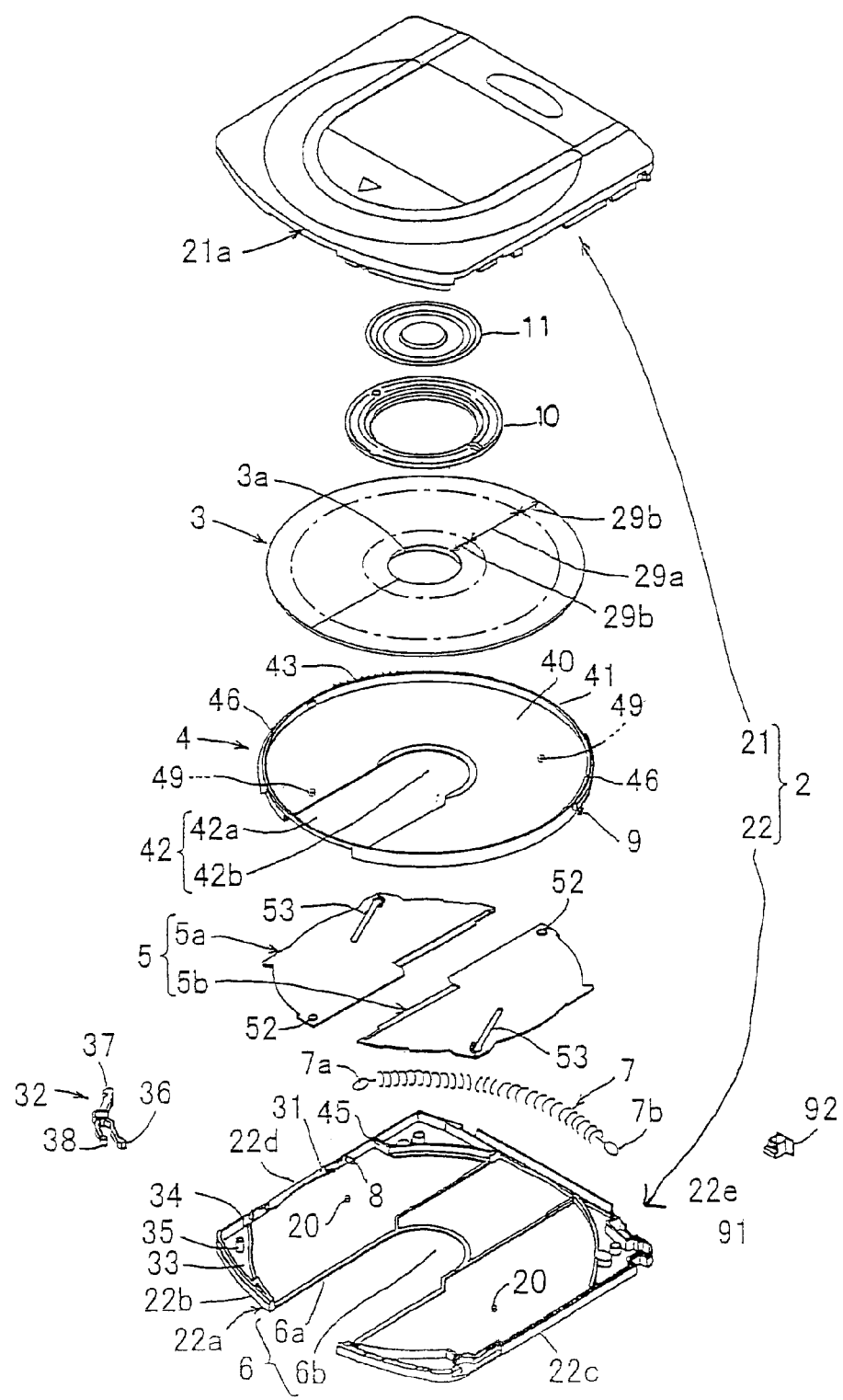
FIG. 3 is an exploded perspective view of FIG. 1.
Figure 4:
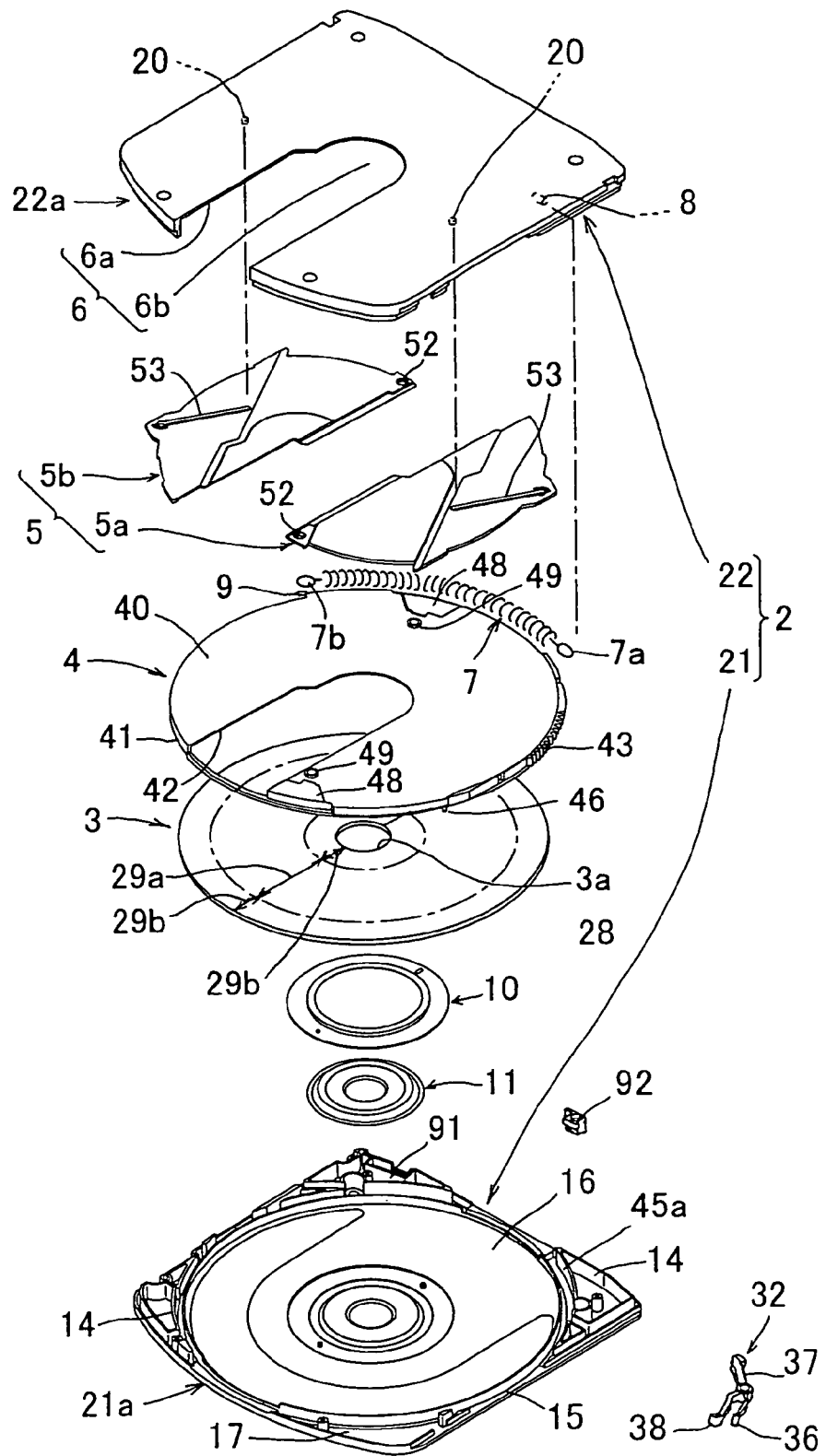
FIG. 4 is an exploded perspective view of FIG. 2.
Figure 5:
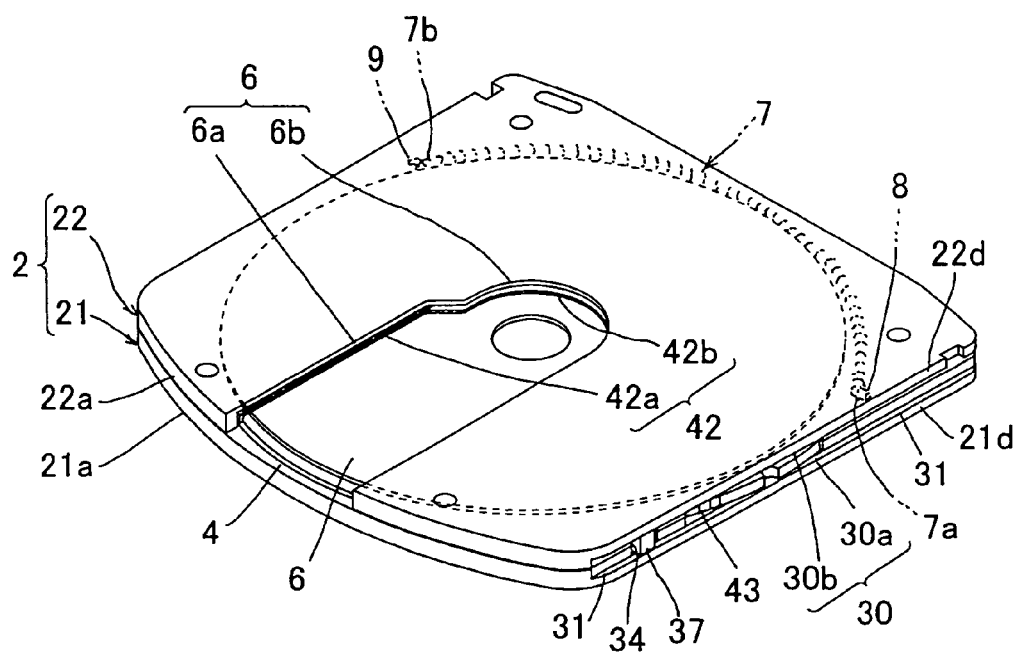
FIG. 5 is a perspective view showing the recording medium cartridge viewed from a lower surface side (a shutter opening state).

(1) Schematic Structure of Recording Medium Cartridge and Structure of Shutter Spring FIG. 1 is a perspective view showing a recording medium cartridge viewed from an upper surface side. FIG. 2 is a perspective view showing the recording medium cartridge viewed from a lower surface side. FIG. 3 is an exploded perspective view of FIG. 1. FIG. 4 is an exploded perspective view of FIG. 2. FIG. 5 is a perspective view showing the recording medium cartridge in a shutter opening state viewed from a lower surface side.

As shown in FIGS. 1 to 5, a recording medium cartridge 1 includes an information recording medium 3, an inner rotor 4 and a shutter 5 that are accommodated in a cartridge casing 2. An opening part 6 provided in the cartridge casing (shell) 2 is opened and closed by the shutter 5. The shutter 5 is driven to open and close by rotating the inner rotor 4.

Torque is applied to the inner rotor 4 by a shutter spring 7 (referred to hereinafter as a coil spring).

Figure 6:
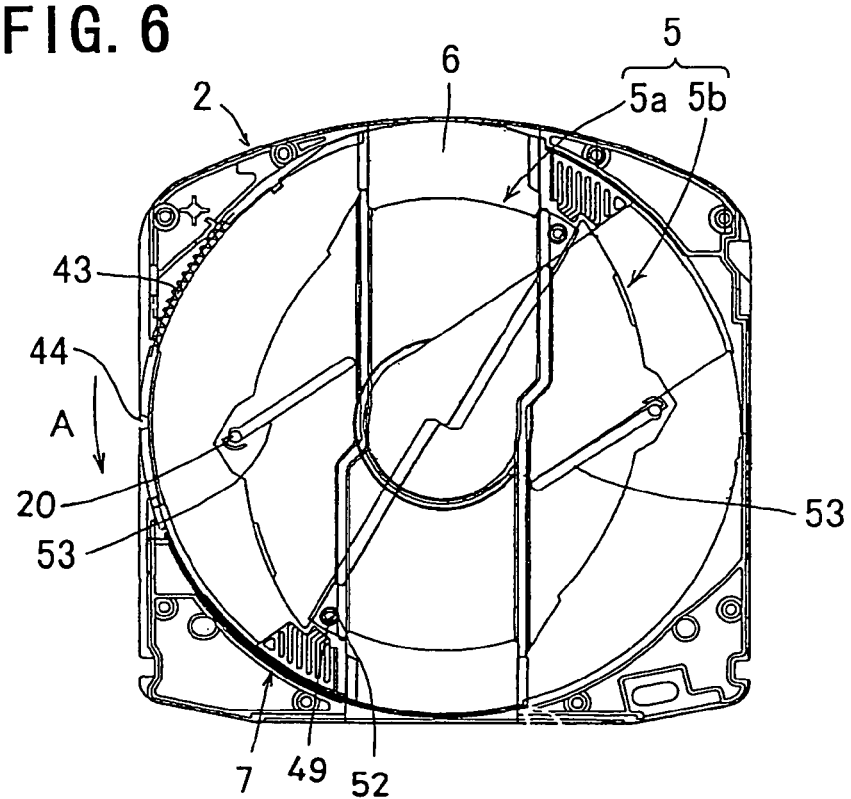
FIG. 6 is a bottom view of main parts of the cartridge showing a state in which a shutter is closed from the lower surface side.
Figure 7:
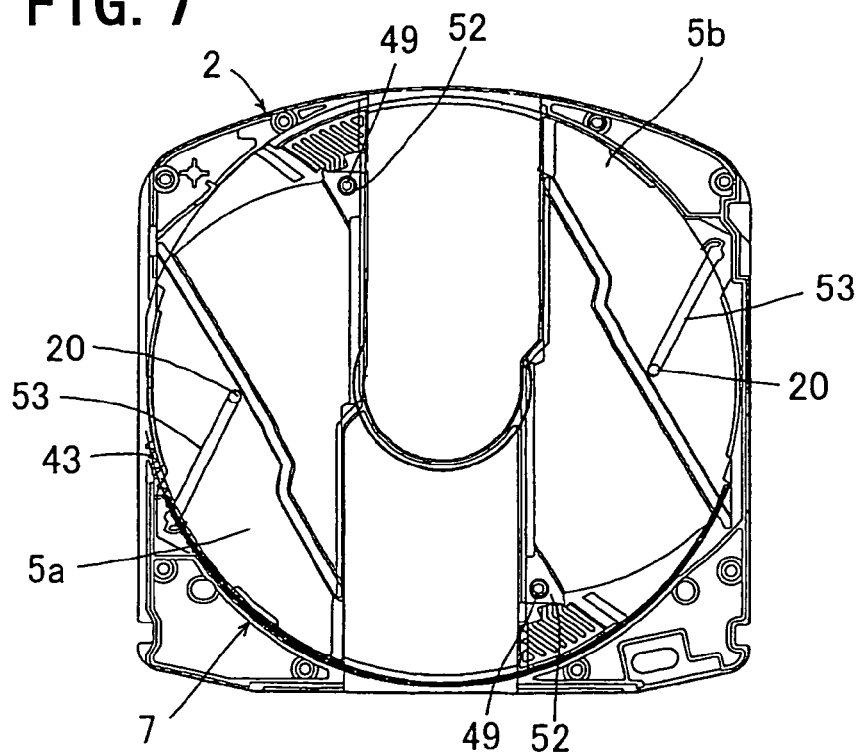
FIG. 7 is a bottom view of main parts of the cartridge showing a state in which the shutter is opened from the lower surface side.

The coil spring 7 rotates the inner rotor 4 to move the shutter 5 composed of a pair of shutter members 5a and 5b to a first position at which the opening part 6 provided in the cartridge casing 2 is closed, as shown in FIG. 6. Then, when the recording medium cartridge 1 is inserted into a disc recording and reproducing device described below, the inner rotor 4 is rotated against the resilient force of the coil spring 7 by a shutter opening mechanism provided in the disc recording and reproducing device. Thus, the pair of shutter members 5a and 5b of the shutter 5 is moved to a second position at which the opening part 6 provided in the cartridge casing 2 is opened, as shown in FIG. 7.

Figure 8:
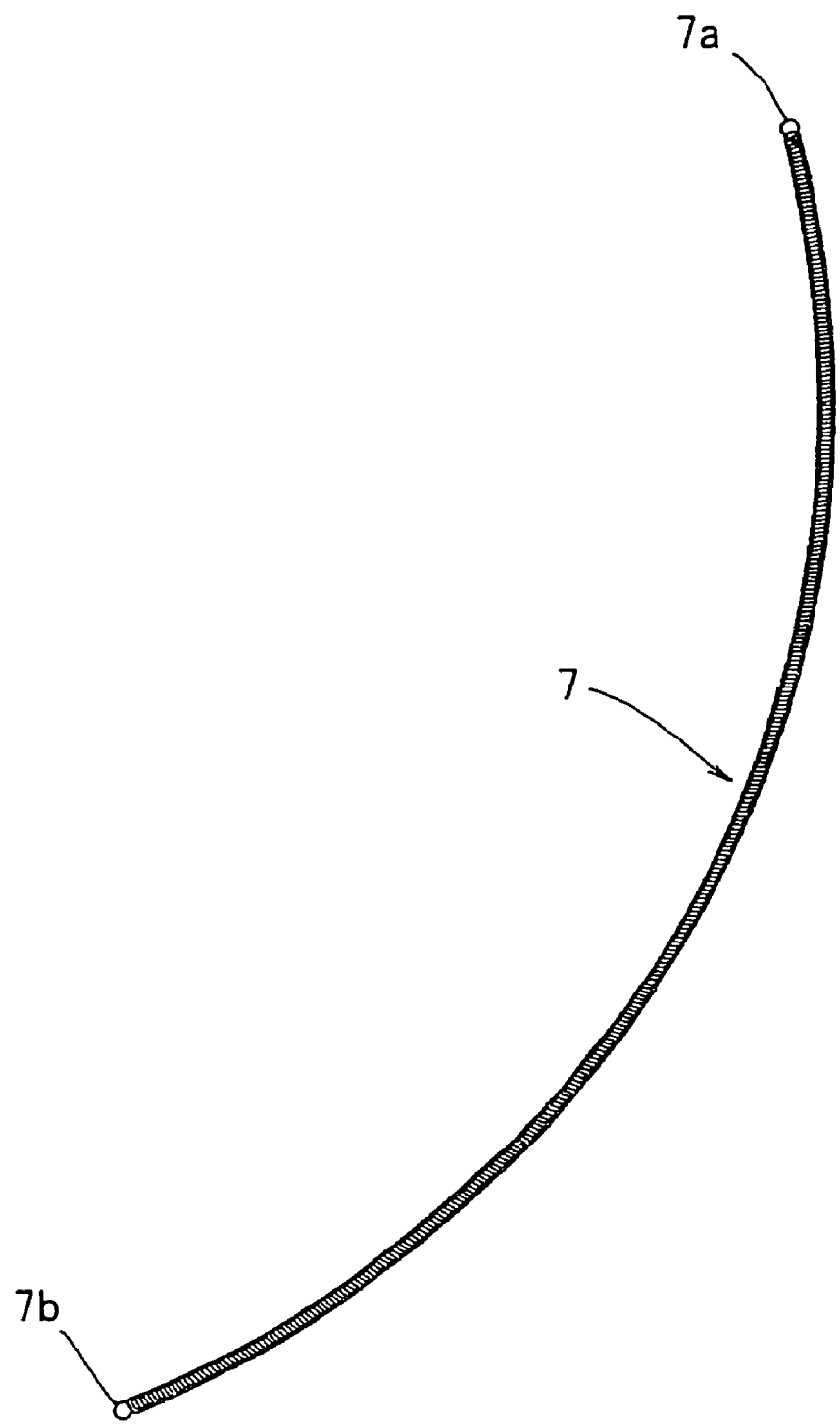
FIG. 8 is a perspective view of a shutter spring.

As shown in FIG. 8, as the coil spring 7, an extension coil spring having a wire diameter of 0.2 mm or smaller and a coil diameter of 1.5 mm or smaller is used. The coil spring is formed in a curved shape corresponding to the curvature of the outer peripheral part of the inner rotor 4. The coil spring has ring shaped engaging parts 7a and 7b at both ends in the direction of length.

Figure 9:
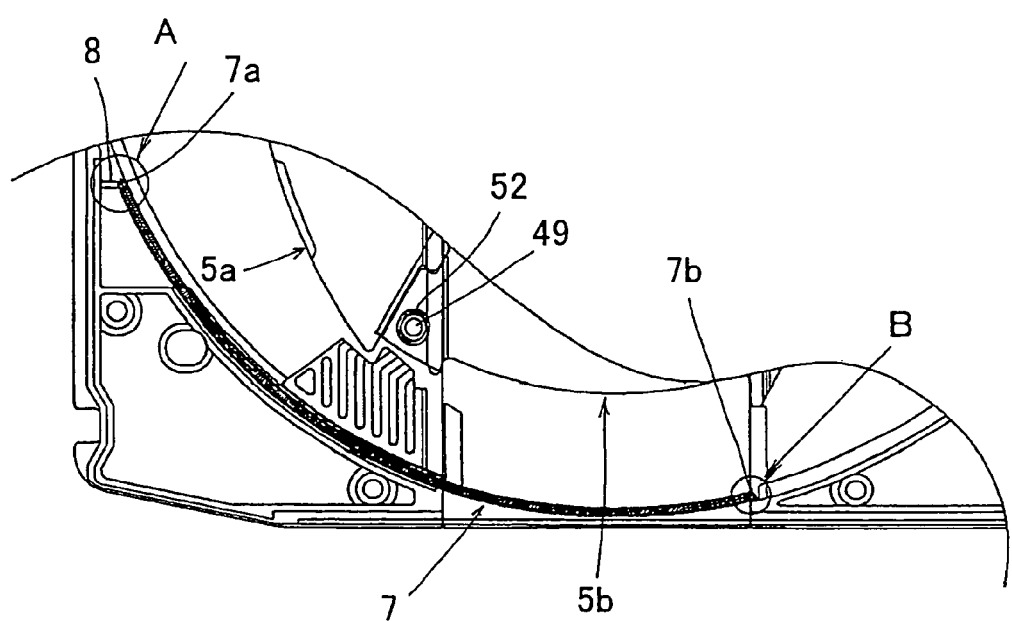
FIG. 9 is an enlarged plan view of a shutter spring attaching part.

As shown in FIG. 9, the coil spring 7 is arranged so as to be wound on the outer peripheral part of the inner rotor 4. The engaging part 7a at one end is engaged with the cartridge casing 2 side. The engaging part 7b at the other end is engaged with the inner rotor 4.

Figure 10A:
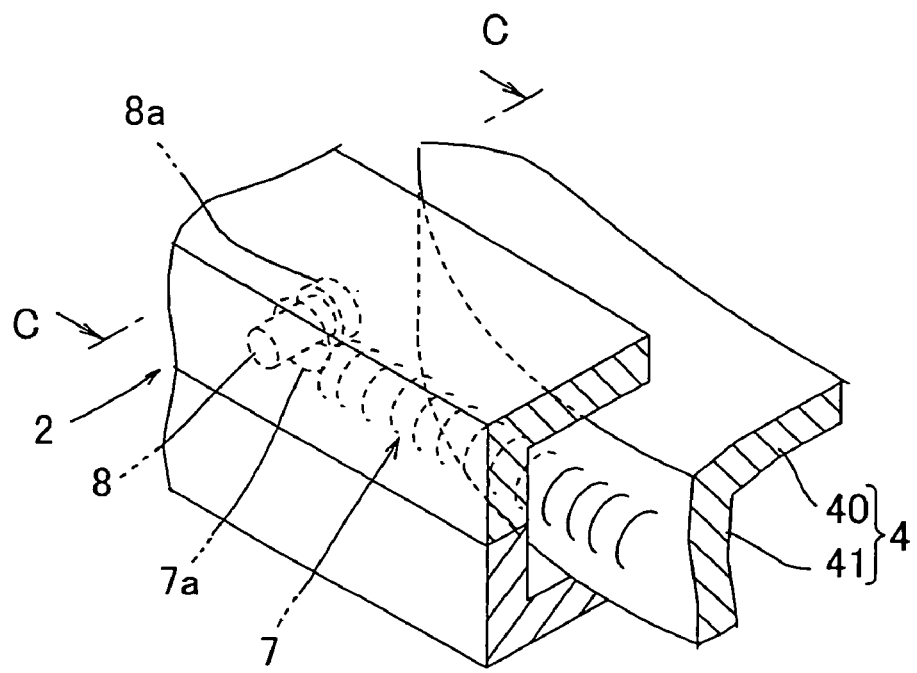
FIG. 10A is a perspective view of an engaging part (part A of FIG. 9) of a shell side with one end of the shutter spring.
Figure 10B:
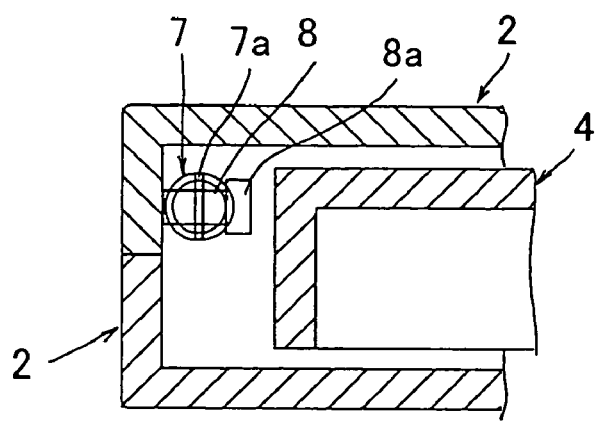
FIG. 10B is a sectional view taken along a line C—C of FIG. 10A.

As shown in FIG. 10, the engaging part 7a at one end of the coil spring 7 is engaged with a boss shaped spring engaging part 8 protruding on the inner surface of the cartridge casing 2. The end part of the spring engaging part 8 is provided with an engaging part slip preventing flange part 8a.

Figure 11A:
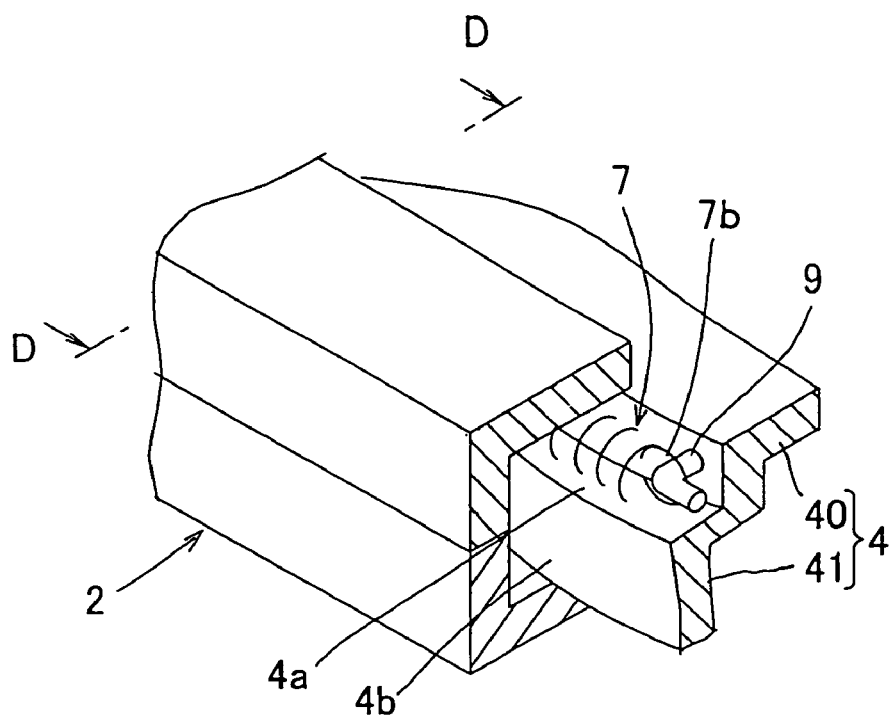
FIG. 11A is a perspective view of an engaging part (part B of FIG. 9) of the other end of the shutter spring with an inner rotor side.
Figure 11B:
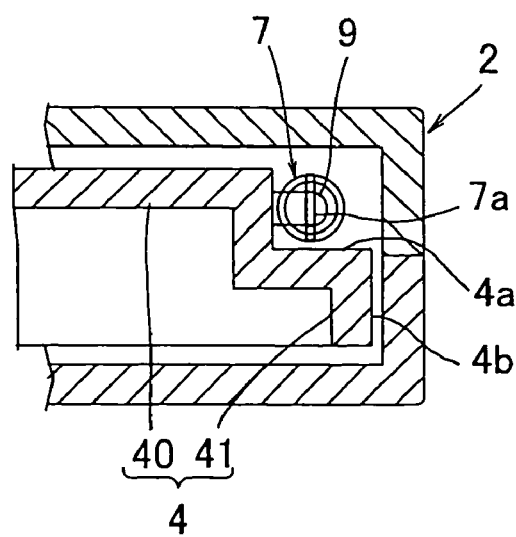
FIG. 11B is a sectional view taken along a line D—D of FIG. 11A.

Further, as shown in FIG. 11, the engaging part 7b at the other end of the coil spring 7 is engaged with a hook shaped spring engaging part 9 provided in a coil spring attaching part 4a of the inner rotor 4.

The coil spring attaching part 4a is formed by recessing the end part of a ring part 41 side on the outer peripheral surface 4b of the inner rotor 4 in an annular form. When the coil spring 7 is attached to the coil spring attaching part, the outer peripheral part 7a of the coil spring 7 is prevented from protruding from the outer peripheral surface 4b of the ring part 41 of the inner rotor 4 to come into contact with the cartridge casing 2 side.

(2) Structure of Cartridge Casing

As shown in FIG. 1, the cartridge casing 2 is formed by butting the peripheral surfaces 21a and 22a of upper and lower shells 21 and 22 on each other.

Figure 12:
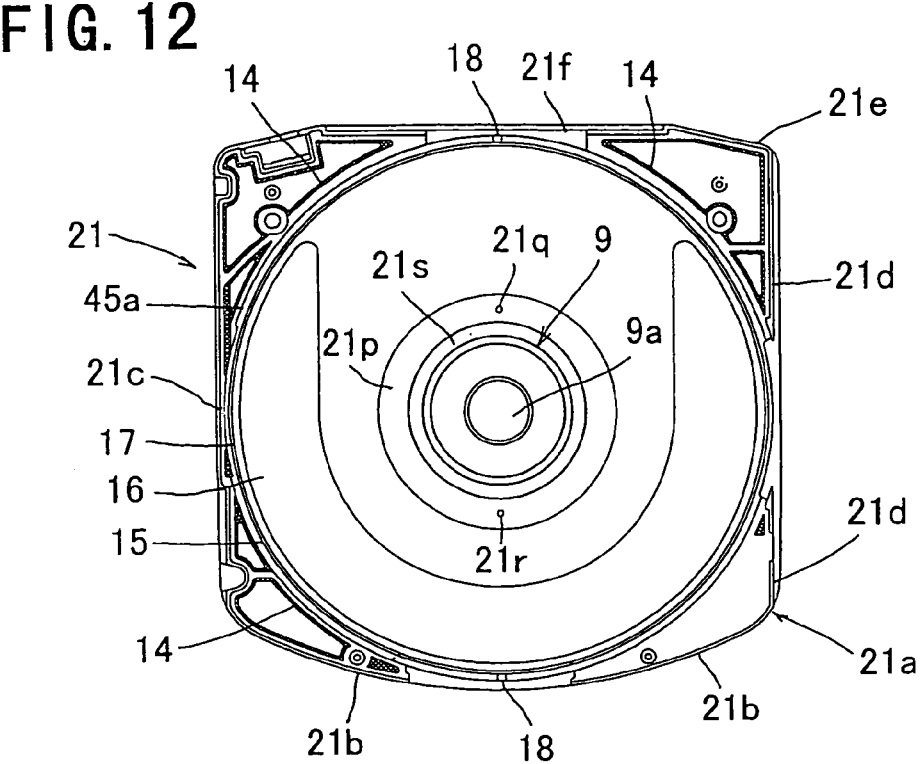
FIG. 12 is a plan view of an inner surface side of an upper shell.

As shown in FIG. 12, the upper shell 21 is formed with a substantially square shaped thin tray member having a circular arc shaped front surface side. A peripheral wall 21a is provided in its outer peripheral edge part.

The peripheral wall 21a includes a front edge part 21b, a pair of side edge parts 21c and 21d and a rear edge part 21e. On the central part of the rear edge part 21e, a positioning recessed part 21f for positioning relative to the lower shell 22 is provided.

Inside the peripheral wall 21a, specifically, in the corner part of the front edge part 21b and one side edge part 21c, the corner part of one side edge part 21c and the rear edge part 21e, and the corner part of the rear edge part 21e and the other side edge part 21d, respectively, circular arc shaped ribs 14 are provided.

Inside the circular arc shaped ribs 14, a ring shaped rib 15 is provided. Inside the ring shaped rib 15, an accommodating part 16 for the disc 3 is provided.

Outside the ring shaped rib 15, a ring shaped recessed part 17 to which the end of the ring part of the inner rotor 4 is fitted is provided, as specifically described later. At symmetrical positions in upper and lower parts on the bottom surface of the ring shaped recessed part 17 (positions in which a phase is shifted by 180°), lift-up protruding parts 18 are provided for moving the inner rotor 4 so as to be separated from the lower shell 22. The lift-up protruding parts 18 are mounted on lift-up protruding parts 46 of the inner rotor side provided on the end face of the ring part 41 of the inner rotor 4. Thus, the inner rotor 4 is moved so as to be separated from the upper shell 21.

Figure 13:
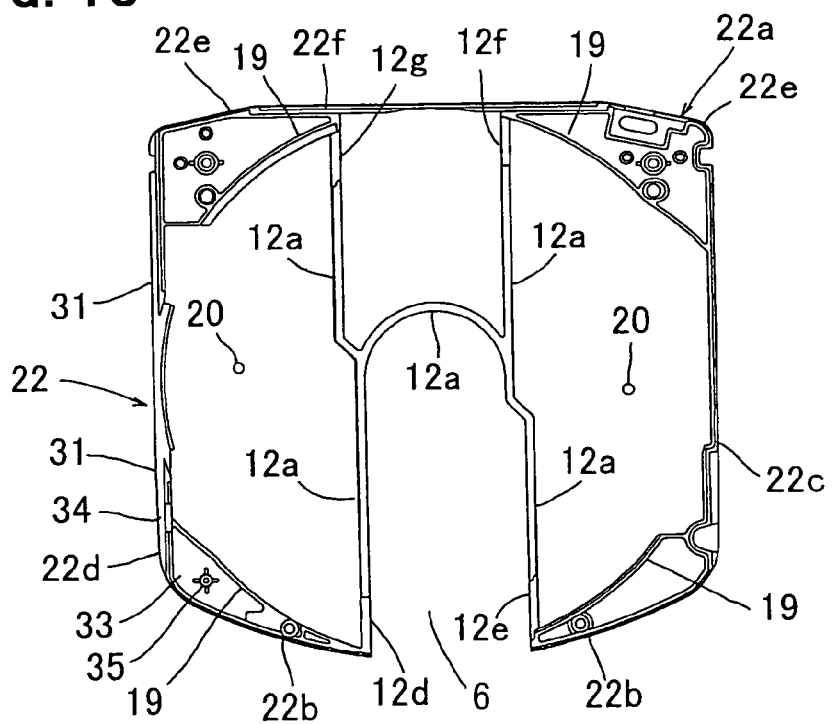
FIG. 13 is a plan view of an inner surface side of a lower shell.

As shown in FIG. 13, the lower shell 22 is formed with a substantially square shaped thin dish member having a circular arc shaped front surface side like the upper shell 21. A peripheral wall 22a is provided on its outer peripheral edge part.

The peripheral wall 22a includes a front edge part 22b, a pair of side edge parts 22c and 22d and a rear edge part 22e. On the central part of the rear edge part 22e, a positioning protruding part 22f for positioning relative to the upper shell 21 is provided.

Inside the peripheral wall 22a, specifically, in the corner part of the front edge part 22b and one side edge part 22c, the corner part of one side edge part 22c and the rear edge part 22e, and the corner part of the rear edge part 22e and the other side edge part 22d, respectively, circular arc shaped ribs 19 are provided.

Inside the circular arc shaped ribs 19 of the lower shell 22, an accommodating part for accommodating substantially half the thickness of the inner rotor 4 and a pair of shutters 5 is provided.

The upper and lower shells 21 and 22 are superposed on each other while the positioning protruding part 22f is fitted to the positioning recessed part 21f and the peripheral walls 21a and 22a are butted on each other.

On the lower shell 22, the opening part 6 is provided from the central part to the front edge part 22*b*. The opening part 6 includes a recording/reproducing opening part 6*a* for allowing a turn table of a disc rotating and driving mechanism and the optical head of an optical pick-up device to face the information recording medium 3 and a central opening part 6*b* for allowing the turn table of the disc rotating and driving mechanism to face information recording medium 3.

As shown in FIG. 2, at the substantially central parts of one side edge parts 21*d* and 22*d* of the upper and lower shells 21 and 22, an opening window 30 for exposing a part of a gear 43 on the outer peripheral surface of the inner rotor 4 is provided. The opening window 30 is formed by an upper shell side cut-out part 30*a* provided in the upper shell 21 and a lower shell side cut-out part 30*b* provided in the lower shell 22. Further, on the one side edge parts 21*c* and 22*c* of the upper and lower shells 21 and 22, guide grooves 31 extend forward and backward along connected surfaces. The guide grooves 31 are provided for the purpose of preventing an erroneous insert when the recording medium cartridge 1 is mounted on the disc recording and reproducing device. The guide grooves 31 communicate with the opening window 30.

As shown in FIG. 3, in the corner part of the front edge part 22*b* of the lower shell 22 and one side edge part 22*d*, a lock member accommodating part 33 in which a lock member 32 is accommodated to freely rotate is provided. The lock member accommodating part 33 communicates with an accommodating part for the inner rotor of the lower shell 22 or the like and communicates with the guide grooves 31 through an opening hole 34 provided in one side edge part 22*d*. Further, in the lock member accommodating part 33 of the lower shell 22, a support shaft 35 for supporting the lock member 32 so as to freely rotate protrudes to the upper shell 21 side.

The lock member 32 is formed with a lever shaped member fitted to the support shaft 35 so as to freely rotate and swing in the direction of a plane. A stopper part 36 having a plurality of teeth is provided at one end in the longitudinal direction of the lock member 32. An operating part 37 is provided at the other end in the longitudinal direction of the lock member 32. Further, the lock member 32 is provided integrally with a spring piece 38 protruding in the same direction so as to be opposed to the stopper part 36.

The lock member 32 is fitted to the support shaft 35 while the stopper part 36 is directed to the accommodating part for the inner rotor or the like and the spring piece 38 abuts on the inner surface of the front edge part 22*b*. The stopper part 36 is urged toward the accommodating part for the inner rotor or the like by the resilient force of the spring piece 38 and the operating part 37 passes through the opening hole 34 from inside and protrudes into the guide grooves 31. Further, as shown in FIG. 3, to an erroneous erase preventing member attaching part 91 provided in the corner part of the one side edge part 22*c* and the rear edge part 22*e* of the lower shell 22, an erroneous erase preventing member 92 is attached for preventing information recorded on the recording medium, such as an optical disc, from being erroneously erased.

(3) Structure of Information Recording Medium

As the information recording medium 3, a ROM optical disc exclusively used for reproducing on which a music signal as audio information or a video signal as video information and various kinds of information signals such as music signals are previously recorded, or a write-once optical disc on which an information signal such as audio information or video information can be recorded only once, or a rewritable optical disc capable of repeatedly recording information many times has been known. In this embodiment, the rewritable optical disc (refer an information recording medium simply to as an optical disc, hereinafter) is used.

As shown in FIG. 3, the optical disc 3 is made of a thin disc shaped recording member having a center hole 3*a* at a central part.

The optical disc 3 is chucked on the turn table of a disc recording and reproducing device by a chucking plate 11 attached to the inner surface of the upper shell 21 by a chucking plate pressing member 10. Thus, the optical disc is integrally formed in the rotating direction and rotated at a prescribed speed (for instance, a constant angular velocity for each turn: ZCAV).

On one surface of the optical disc 3, an information recording area 29*a* opposed to the optical head of the optical pick-up device incorporated in the recording and reproducing device and capable of recording information and a non-recording area 29*b* incapable of recording information are provided. The non-recording area 29*b* includes an inside non-recording area 29*b* provided with a prescribed width outside the center hole 3*a* in the central part of the optical disc 3 and an outside non-recording area 29*b* provided with a prescribed width on the outer peripheral edge of the optical disc 3. The information recording area 29*a* is provided between the inside and outside non-recording areas 29*b* and 29*b*.

The optical disc 3 is accommodated in the ring part 41 of the below-described inner rotor 4 so as to rotate freely. As the material of a substrate of the optical disc 3, a synthetic resin, such as polycarbonate (PC), polymethacrylate (PMMA), is preferable. However, it is to be understood that other synthetic resins may be used and various kinds of materials such as a glass material, aluminum alloy, etc. may be used except the synthetic resin.

The information recording medium is not limited to the optical disc. The information recording medium may be applied to a magnetic disc in which a magnetic thin film layer is formed on the surface of a thin disc to store information in accordance with the magnetized condition of a specific position, or a magneto-optical disc in which an optical head and a magnetic head are used on a similarly formed magnetic thin film layer to write or read information and other recording media.

(4) Structure of Inner Rotor

As shown in FIG. 3, the inner rotor 4 includes a flat surface part 40 made of a disc shaped thin member and the ring part 41 provided continuously to the outer peripheral edge of the flat surface part 40. On the flat surface part 40 of the inner rotor 4, an opening part 42 is formed. The opening part 42, like the opening part 6 of the lower shell 22, includes a recording/reproducing opening part 42*a* for allowing the turn table of the disc rotating and driving mechanism and the optical head of the optical pick-up device to face the information recording medium 3 and a central opening part 42*b* for allowing the turn table of the disc rotating and driving mechanism to face the information recording medium 3.

As shown in FIG. 4, the ring part 41 is formed in a cylindrical shape having a diameter slightly larger than the outside diameter of the ring shaped rib 15 provided in the inner surface of the upper shell 21. The ring part 41 is fitted to the outer periphery of the ring shaped rib 15 so as to freely rotate and the end part thereof is inserted into the ring shaped recessed part 17 provided outside the ring shaped rib 15.

Figure 14:
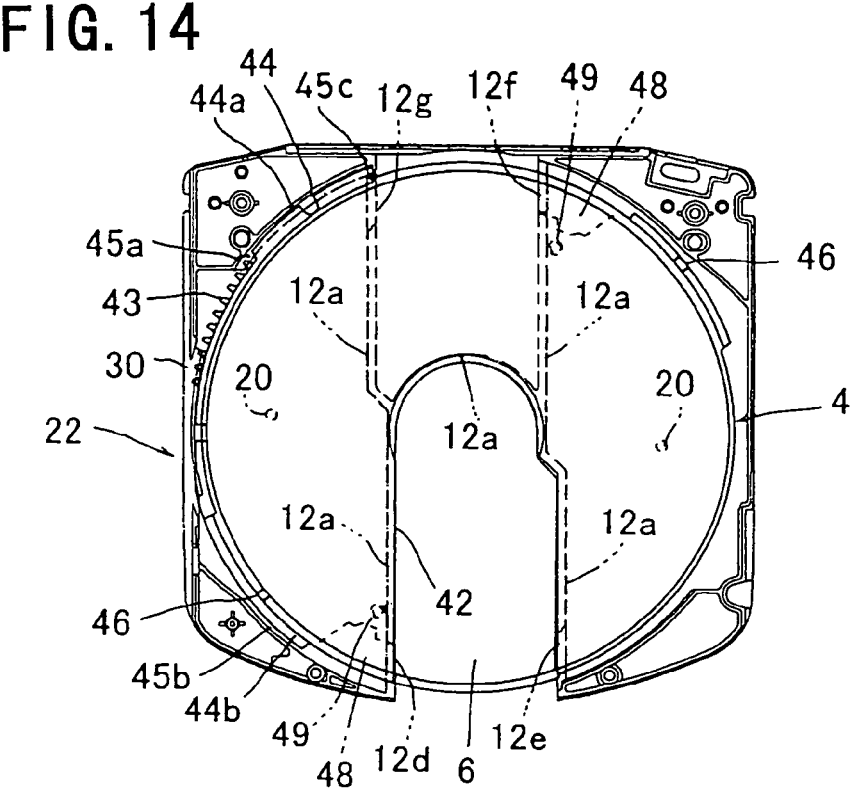
FIG. 14 is a plan view showing a state in which the inner rotor is attached to the lower shell to align the opening parts of both the members with each other.
Figure 15:
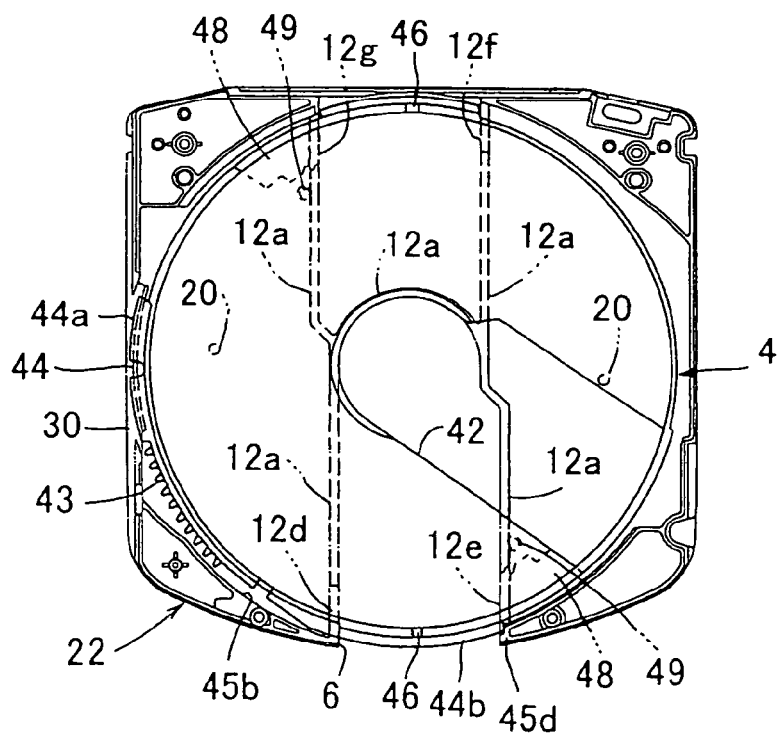
FIG. 15 is a plan view showing a state in which the inner rotor is attached to the lower shell to displace the positions of the opening parts of both the members from each other.

On the outer peripheral surface of the ring part 41, a gear part 43 having many teeth over a prescribed range in the circumference direction is provided. The gear part 43 is set to have an angle range a little larger than the rotating angle of the inner rotor 4. That is, as shown in FIG. 15, when the opening part 42 of the inner rotor 4 is inclined to a maximum relative to the opening part 6 of the lower shell 22 so that the pair of shutter members 5*a* and 5*b* are completely closed as described below, an end of the gear part 43 in the circumference direction is located (exposed) at one end of the opening window 30. A protrusion engaging recessed part 44 provided in a stopper part 44*a* described below is located (exposed) at the central part of the opening window 30. As shown in FIG. 14, when the inner rotor 4 is rotated by a prescribed angle so that the opening part 42 is superposed on the opening part 6 and the one pair of shutter members 5*a* and 5*b* are completely opened, the other end of the gear part 43 in the circumference direction is located (exposed) in the opening window 30.

On both the sides of the gear part 43 of the inner rotor 4, stopper parts 44*a* and 44*b* for controlling an amount of rotation and movement of the inner rotor 4 are provided to protrude outward in the radial direction.

As described above, since the gear part 43 and the stopper parts 44*a* and 44*b* protrude outside the outer peripheral surface of the ring part 41, clearance grooves 45*a* and 45*b* are respectively provided on the corresponding parts of the upper shell 21 and the lower shell 22. Thus, contact with the stopper parts 44*a* and 44*b* is avoided to permit the stoppers to pass.

As shown in FIG. 14, when the opening part 42 of the inner rotor 4 is superposed on the opening part 6 of the lower shell 22, one end part of the stopper part 44*a* is engaged with a stopper engaging part 45*c* provided in one end part of the clearance groove 45*a* to prevent the further rotation of the inner rotor 4. Further, as shown in FIG. 15, when the opening part 42 of the inner rotor 4 is inclined to a maximum relative to the opening part 6 of the lower shell 22, one end part of the stopper part 44*b* is engaged with a stopper engaging part 45*d* provided at one end part of the opening part 6 to prevent the further rotation of the inner rotor 4.

Figure 22A:
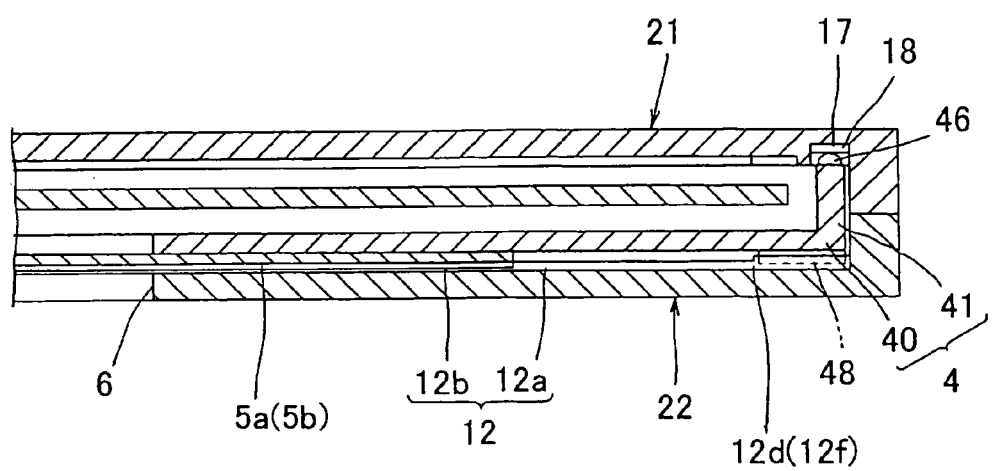
FIG. 22A is a sectional view showing a state in which the lift-up protruding part of the inner rotor is mounted on the lift-up protruding part of the upper shell and FIG. 22B is a sectional view showing a state in which lift-up protruding part of the inner rotor is disengaged from the lift-up protruding pat of the upper shell.

On the end face of the ring part 41, lift-up protruding parts 46 are provided at two positions in the circumference direction. While the opening part 42 of the inner rotor 4 is inclined to a maximum relative to the opening part 6 of the lower shell 22, as shown in FIG. 15, the lift-up protruding parts 46 of the inner rotor 4 side are mounted on lift-up protruding parts 18 provided in the ring shaped recessed parts 17 of the upper shell 21, as shown in FIG. 22(A). Further, on a surface opposite to the ring part 41 of the flat surface part 40 of the inner rotor 4, a pair of support shafts 49 and 49 for supporting the pair of shutter members 5*a* and 5*b* so as to freely rotate in the direction of a plane, as shown in FIG. 4, are provided. The pair of support shafts 49 and 49 are respectively point-symmetrically provided on the opening part 42 as a center. Further, in the vicinity of the pair of support shafts 49 and 49, fitting releasing protruding parts 48 and 48, which have trapezoidal forms and substantially the same height as that of a substantially H-shaped ribbed protruding part 12*a* provided in the lower shell 22, are provided. These fitting releasing protruding parts 48 and 48 serve to pull out the ribbed protruding part 12*a* from a groove shaped recessed part 12*b* when the shutter members 5*a* and 5*b* move from the position shown in FIG. 15 (first position) where the opening 6 is closed to the position shown in FIG. 14 (second position) where the opening part 6 is opened.

The trapezoidal fitting releasing protruding parts 48 and 48 are located in the side parts of second and fourth height parts 12*e* and 12*g* provided in the end parts of the substantially H-shaped ribbed protruding part 12*a* provided in the lower shell 22 in the position shown in FIG. 15.

(5) Structure of Shutter

Figure 16:
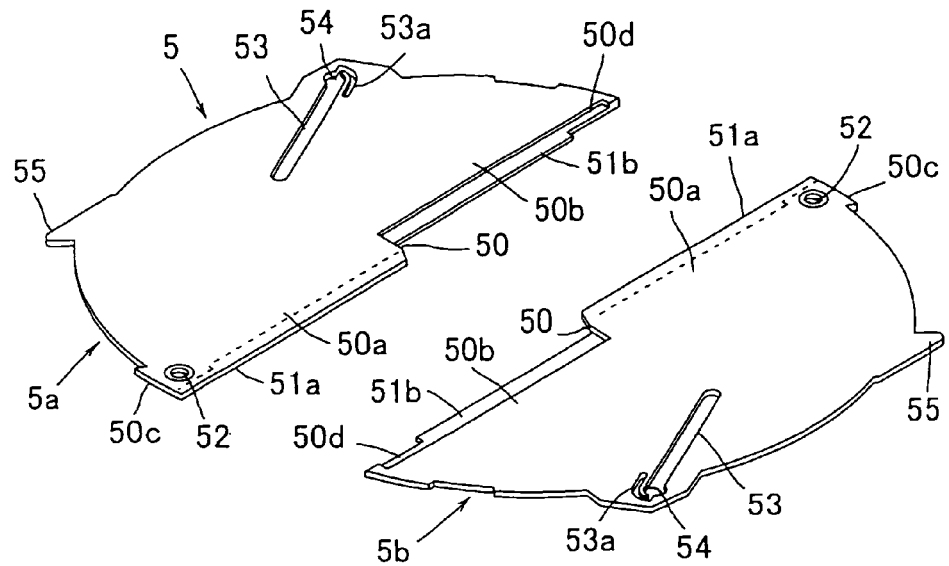
FIG. 16 is a perspective view of a shutter member viewed from an upper surface side.
Figure 17:
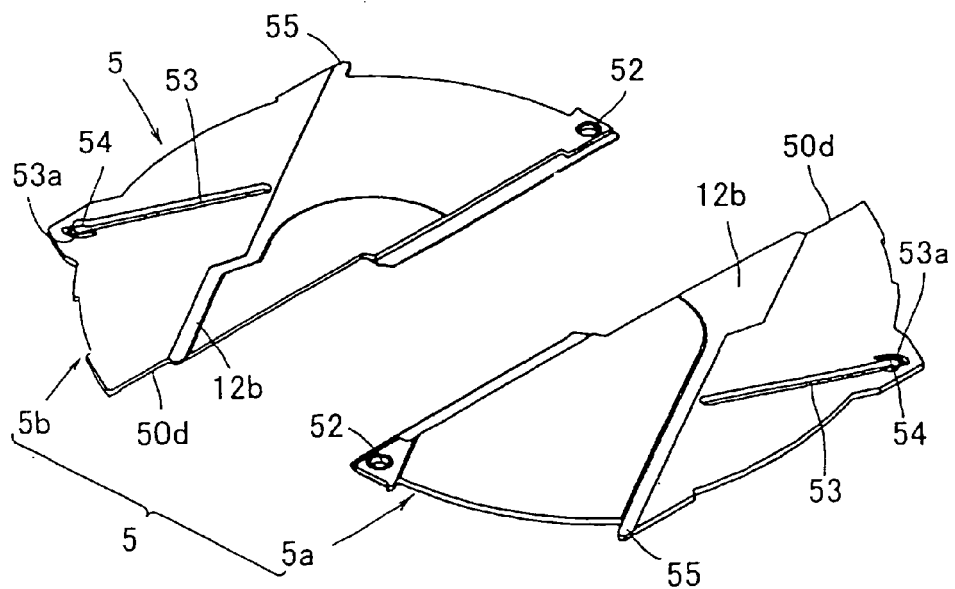
FIG. 17 is a perspective view of the shutter member viewed from a lower surface side.

As shown in FIGS. 16 and 17, the shutter 5 is composed of a pair of shutter members 5*a* and 5*b* that are formed in the same shape and size. The pair of shutter members 5*a* and 5*b* is made of a plate member having substantially the same thickness as the height of the first to the fourth height parts 12*d* to 12*g* (see FIG. 13) of the substantially H-shaped ribbed protruding part 12*a* provided in the lower shell 22.

On the substantially central parts of the side lines of the pair of shutter members 5*a* and 5*b*, step parts 50 are formed with prescribed lengths in the directions perpendicular to the side lines. On both the sides of step parts 50, protruding side connecting parts 50*a* and recessed side connecting parts 50*b* are formed through the step parts 50. On the connecting parts 50*a* and 50*b* of the shutter members 5*a* and 5*b*, roof parts 51*a* and 51*b* are respectively protruded in the directions perpendicular to the extending directions of the side lines. Thus, in the pair of the shutter members 5*a* and 5*b*, the end faces of the protruding side connecting parts 50*a* are respectively opposed to the end faces of the recessed side connecting parts 50*b*. Thus, the roof parts 51*a* of the protruding side connecting parts 50*a* are respectively superposed on the roof parts 51*b* of the recessed side connecting parts 50*b*. In shaft attaching parts 50*c* in the end parts of the protruding side connecting parts 50*b* on the side lines of the shutter members 5*a* and 5*b*, shaft receiving holes 52 are respectively formed.

In the end parts of the recessed side connecting parts 50*b* on the side lines of the shutter members 5*a* and 5*b*, cut-out parts 50*d* are respectively provided for introducing the second height part 12*e* or the fourth height part 12*g* provided at the end part of the substantially H-shaped ribbed protruding part 12*a* of the lower shell 22.

Figure 18:
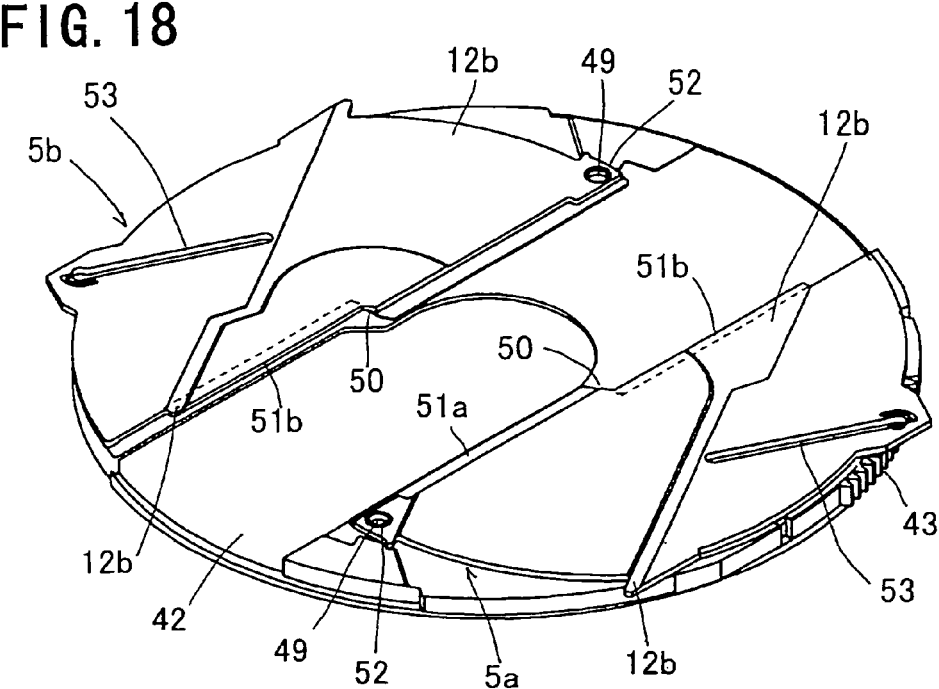
FIG. 18 is a perspective view showing a state in which the shutter member is attached to the inner rotor to open the opening parts.

The support shafts 49 on the flat surface part 40 of the inner rotor 4 are fitted to the shaft receiving holes 52 so that the shutter members 5*a* and 5*b* are respectively attached to the flat surface part 40 of the inner rotor 4 so as to rotate freely. At this time, the pair of shutter members 5*a* and 5*b* are attached with their side lines opposed to each other. As a result, as shown in FIG. 18, when the pair of shutter members 5*a* and 5*b* are rotated so that they are separated outward from each other, the shutter members 5*a* and 5*b* are respectively mounted so as to be superposed on both sides of the opening part 42 of the inner rotor 4 by sandwiching the opening part 42 in between the shutter members. On the other hand, the pair of shutter members 5*a* and 5*b* are respectively rotated inward so that the connecting parts 50*a* respectively abut on the connecting parts 50*b*. Thus, as shown in FIG. 19, the pair of shutter members 5*a* and 5*b* closes the central part of the opening part 42.

Further, as shown in FIGS. 16 to 19, slots 53 (opening and closing grooves) for opening and closing the shutter members 5*a* and 5*b* are respectively provided in the recessed side connecting parts 50*b* of the shutter members 5*a* and 5*b*. The slots 53 respectively extend in the radial direction on the shaft receiving holes 52 of the shutter members 5*a* and 5*b* on which they are provided. In the slots 53, boss shaped protruding parts 20 of the lower shell 22 are engaged to slide freely. Further, in end parts outside the slots 53 respectively, elastic pieces 54 formed by cutting the peripheries thereof and recessed parts 53*a* for releasing the boss shaped protruding parts 20 are provided. In the circular arc side edges of the shutter members 5*a* and 5*b*, closing protruding pieces 55 are provided.

As shown in FIG. 22, while the shutter is closed, the protruding piece 55 of the shutter member 5*a* abuts on the first height part 12*d* of the lower shell 22 and the protruding piece 55 of the shutter member 5*b* abuts on the third height part 12*f* of the lower shell 22. Thus, the space between them is closed.

Figure 19:
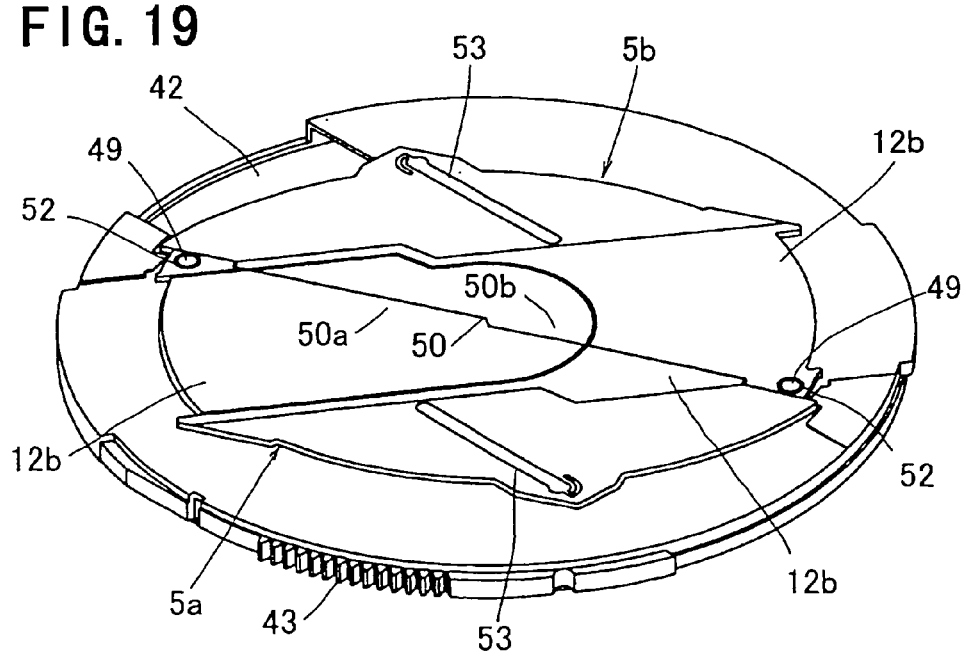
FIG. 19 is a perspective view showing a state in which the shutter member is attached to the inner rotor to close the opening parts.

Further, as shown in FIGS. 18 and 19, on the sliding contact surfaces of the shutter members 5*a* and 5*b* with the lower shell 22, groove shaped recessed parts 12*b* are provided, which are engaged with the substantially H shaped and ribbed protruding parts 12*a* to form dust preventing parts. When the shutter members 5*a* and 5*b* close the opening part 42, the ribbed protruding parts 12*a* of the lower shell 22 are fitted to the groove shaped recessed parts 12*b*.

As the material of the shutter members 5*a* and 5*b*, for instance, synthetic resins, such as an ABS resin (acrylonitrile-Butadiene-Styrene resin), HIPS (high impact polystyrene), POM (polyacetal), etc., are employed. Further, materials of a type having sliding characteristics are preferable. However, it is to be understood that other synthetic resins may be applied, and other metal materials such as aluminum alloy, stainless steel, etc., may be employed.

(6) Operation of Recording Medium Cartridge

Figure 20:
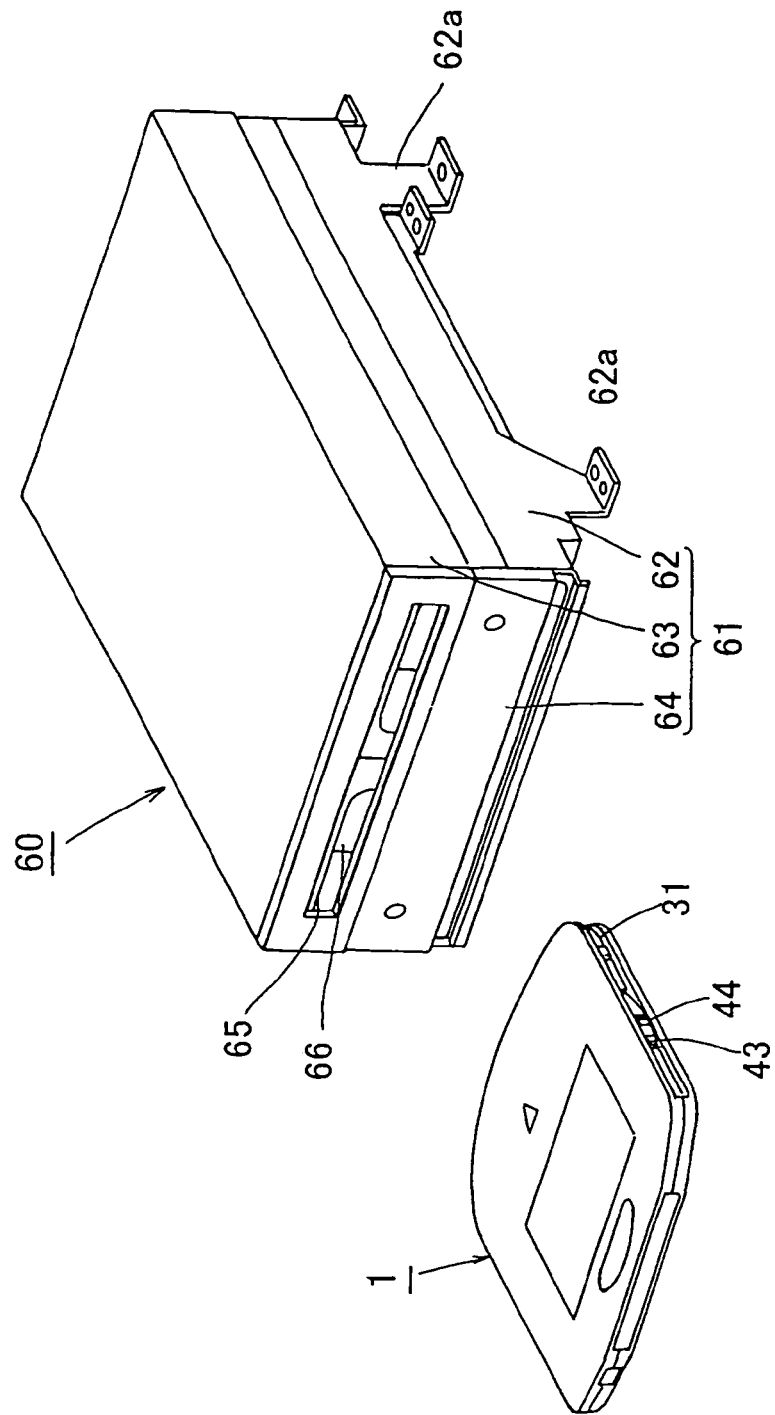
FIG. 20 is a perspective view of a disc recording and reproducing device.

Now, the operation of the recording medium cartridge as well as the structure of the disc recording and reproducing device will be described. The disc recording and reproducing device 60 comprises, as shown in FIG. 20, an outer package case 61 made of a hollow casing and a recording and reproducing device main body (illustration is omitted) accommodated in the outer package case 61 or the like. The outer package case 61 includes a case main body 62 in which an upper surface and a front surface are opened, a case cover body 63 detachably attached to an upper part so as to close the upper surface of the case main body 62 and a front surface panel 64 detachably attached to a front part so as to close the front surfaces of the case main body 62 and the case cover body 63.

Leg members 62*a* protruding downward are provided at four parts of the case main body 62. The disc recording and reproducing device 60 is supported by these leg members 62*a*. The front surface panel 64 is made of a plate shaped member with a long breadth and a cartridge entry port 65 with a long breadth is provided above the front surface panel. The cartridge entry port 65 is formed to a size substantially the same as that of a front surface side of the recording medium cartridge 1. The cartridge entry port 65 is ordinarily closed by an opening and closing door 66 disposed inside the cartridge entry port.

The opening and closing door 66 is pressed by the front part of the recording medium cartridge 1 and inserted to a prescribed position. Thus, the recording medium cartridge 1 is automatically taken in by a loading mechanism not shown in the drawing. Then, the recording medium cartridge 1 conveyed by the loading mechanism is positioned and fixed to a prescribed position in the disc recording and reproducing device 60. At the same time, or before or after the above-described operation, the shutter 5 is operated by a shutter opening and closing mechanism provided in the disc recording and reproducing device 60 to open the opening parts 6 and 42.

Figure 21:
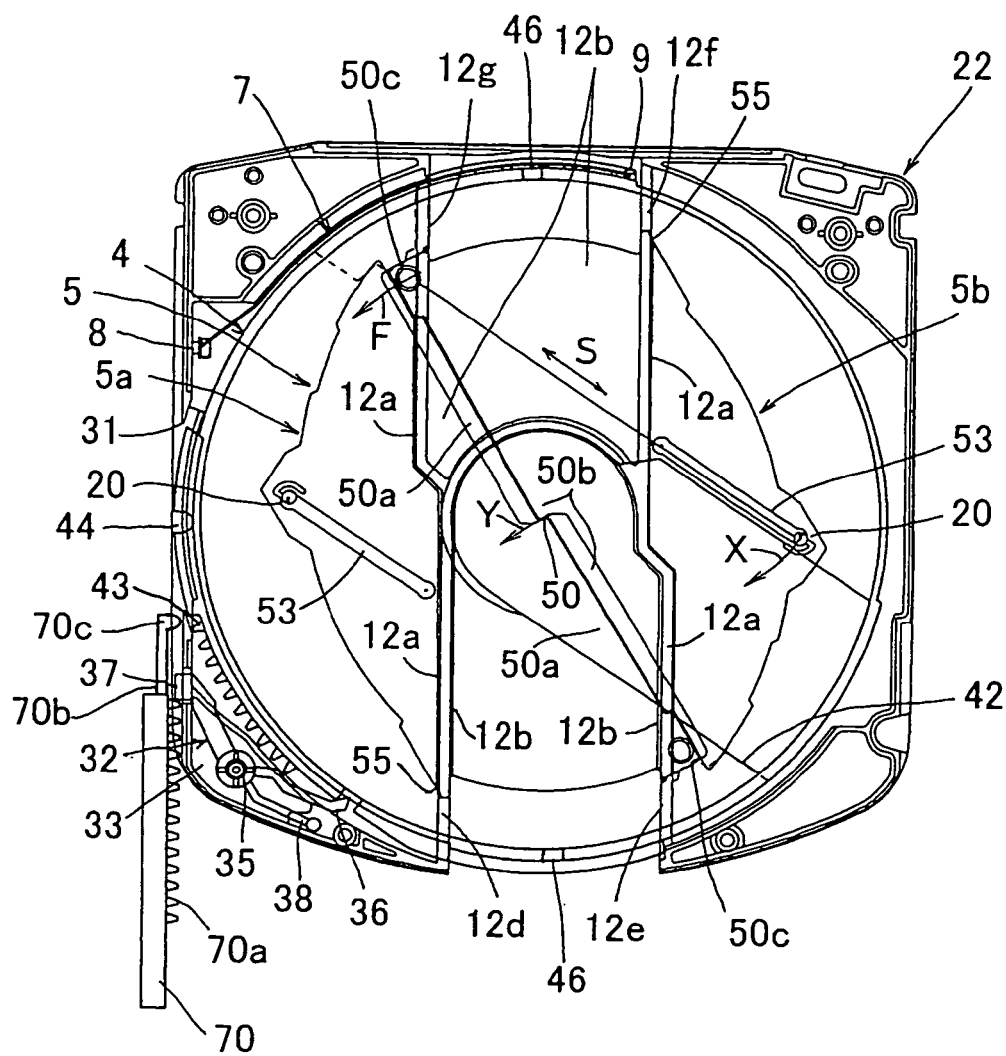
FIG. 21 shows an operational relationship between a cartridge casing and a shutter mechanism and is an explanatory view for showing a state in which opening parts are completely closed by the shutter member.

Specifically, when the recording medium cartridge 1 is inserted to the prescribed position, as shown in FIG. 21, a rack rod 70 of the shutter opening and closing mechanism incorporated in the disc recording and reproducing device 60 enters the guide groove 31 provided in one side surface part of the recording medium cartridge 1. Thus, the operating part 37 of the lock member 32 protruding into the guide groove 31 is pressed into the lock member accommodating part 33 by the pressing force of the rack rod 70 against the resilient force of the spring piece 38. Thus, the locked state of the inner rotor 4 by the lock member 32 is released. A rotating operation protrusion 70*c* provided in the rack rod 70 through an elastic piece 70*b* is engaged with the protrusion engaging recessed part 44 provided in the inner rotor 4 to rotate the inner rotor 4. Further, the rack rod 70 relatively advances, so that the end of a gear part 70*a* thereof is engaged with the gear part 43 of the inner rotor 4.

The gear part 43 engages with the gear part 70*a* of the rack rod 70 to rotate the inner rotor 4 depending on the amount of movement of the rack rod 70. The coil spring 7 is expanded by the rotation of the inner rotor 4 so that the resilient force is accumulated.

FIG. 21 shows a state before the gear part 70*a* of the rack rod 70 engages with the gear part 43 of the inner rotor 4. Under this state, the protruding side connecting parts 50*a* and the recessed side connecting parts 50*b* of the pair of shutter members 5*a* and 5*b* abut on each other and come into tight contact with each other. At this time, since the opening part 42 of the inner rotor 4 is inclined relative to the opening part 6 of the lower shell 22, only the central part in which both the opening parts 6 and 42 are superposed one upon another is opened; however, the opening parts are closed by the pair of the shutter members 5*a* and 5*b*. Accordingly, there is no fear that dust may enter the disc accommodating part from the superposed part of the opening parts 6 and 42.

In parts on which the opening part 6 comes near to the opening part 42 at an acute angle, the shaft attaching parts 50*c* of the pair of shutter members 5*a* and 5*b* are provided. The shaft attaching parts 50*c* are located inside the second and fourth height parts 12*e* and 12*g* of the ribbed protruding part 12*a* to eliminate the space. Further, the closing protruding pieces 55 are provided inside the first and third height parts 12*d* and 12*f* to eliminate the space. Further, the slots 53 provided in the pair of shutter members 5*a* and 5*b* are closed by the lower shell 22 on which the pair of the shutter members 5*a* and 5*b* is superposed. Still further, as shown in FIG. 21, the substantially H-shaped and ribbed protruding part 12*a* provided in the lower shell 22 so as to surround the opening part 6 is fitted to the groove shaped recessed parts 12*b* provided in the shutter members 5*a* and 5*b* to form a crank shaped dust preventing part. Thus, dust is prevented from entering the disc accommodating part through the opening parts 6 and 42.

Figure 22B:
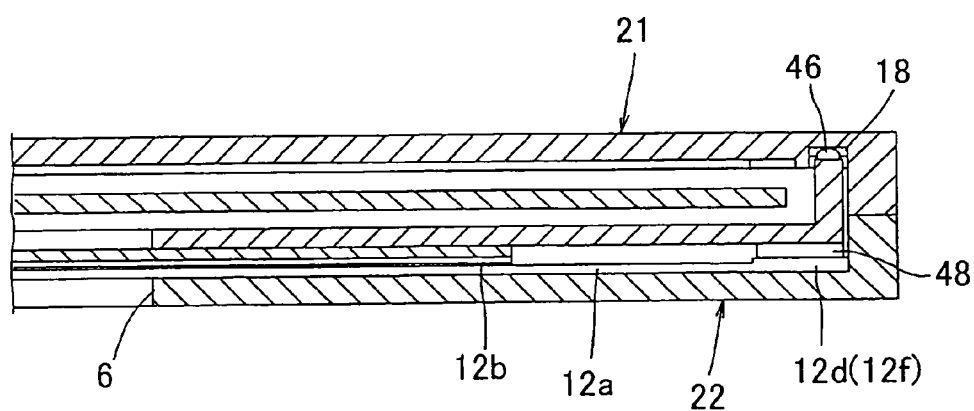

From this state, when the rack rod 70 enters the guide groove 31 corresponding to the inserting operation of the recording medium cartridge 1 and the engagement of the gear part 70*a* with the gear part 43 of the inner rotor 4 is started, the inner rotor 4 is rotated clockwise. In this case, under an initial state that the rotating operation of the inner rotor 4 is started, as shown in FIG. 21 and FIG. 22(A), the lift-up protruding parts 46 of the inner rotor 4 are mounted on the lift-up protruding parts 18 of the upper shell 21 to hold the pair of the shutter members 5*a* and 5*b* by the inner rotor 4. Therefore, the rotating operation of the inner rotor 4 needs a relatively large force. The inner rotor 4 is rotated against a large frictional force due to the mount-up operation of both the lift-up protruding parts 18 and 46, so that the lift-up protruding parts 18 and 46 are disengaged from each other, as shown in FIG. 22(B), to remove the frictional force. Consequently, the subsequent rotating operation of the inner rotor 4 is carried out extremely lightly and smoothly.

The rotation of the inner rotor 4 allows the trapezoidal fitting releasing protruding parts 48 and 48 provided on the bottom surface of the inner rotor 4 to be mounted on the first and third height parts 12*d* and 12*f* of the ribbed protruding part 12*a* of the lower shell 22. Thus, the inner rotor 4 is lifted relative to the lower shell 22 and the shutter members 5*a* and 5*b* are also lifted to pull out the groove shaped recessed parts 12*b* from the ribbed shaped protruding part 12*a*.

At this time, the shaft receiving holes 52 of the shutter members 5*a* and 5*b* are likewise rotated by the rotation of the inner rotor 4. On the other hand, in the slots 53 provided in the other end sides, the boss shaped protruding parts 20 and 20 of the lower shell 22 are respectively engaged to slide freely.

Figure 23:
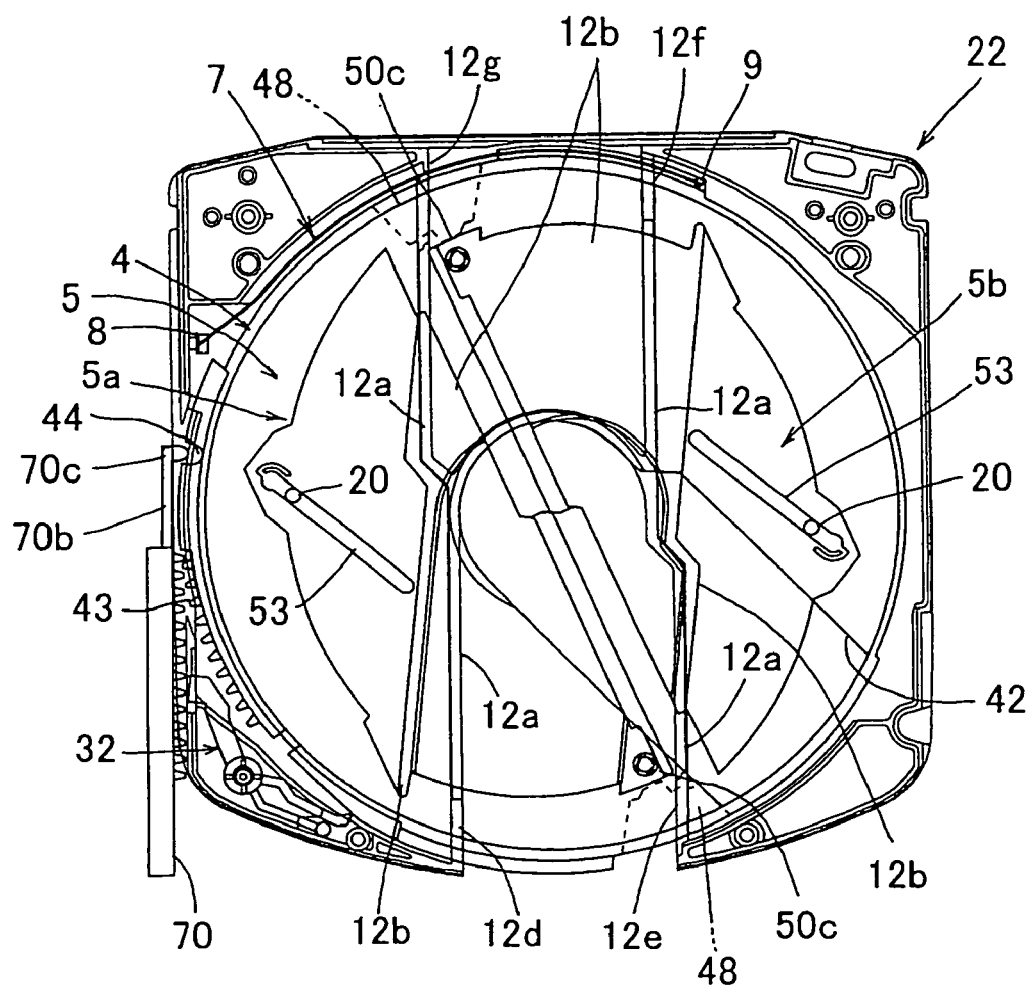
FIG. 23 is an explanatory view showing a state in which the inner rotor is slightly rotated from the state shown in FIG. 21 so that a pair of shutter members is slightly opened.
Figure 24:
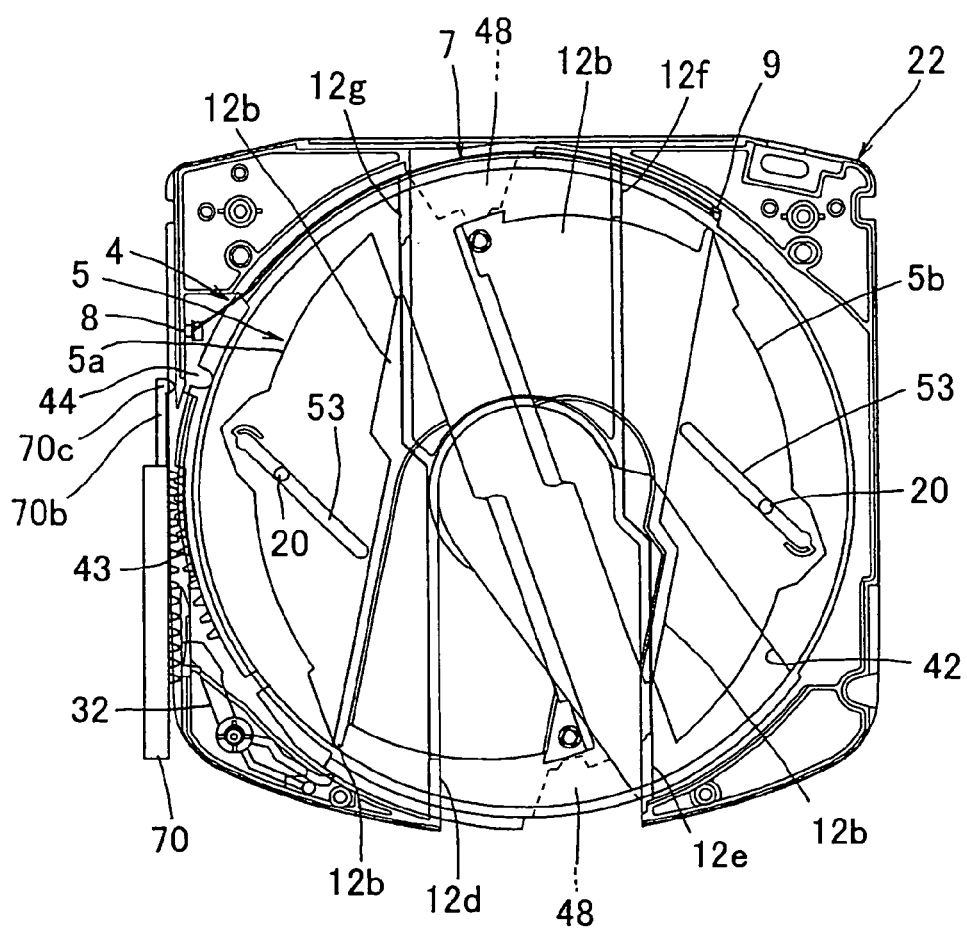
FIG. 24 is an explanatory view showing a state in which the inner rotor is further slightly rotated from the state shown in FIG. 23 so that the pair of shutter members is further slightly opened.
Figure 25:
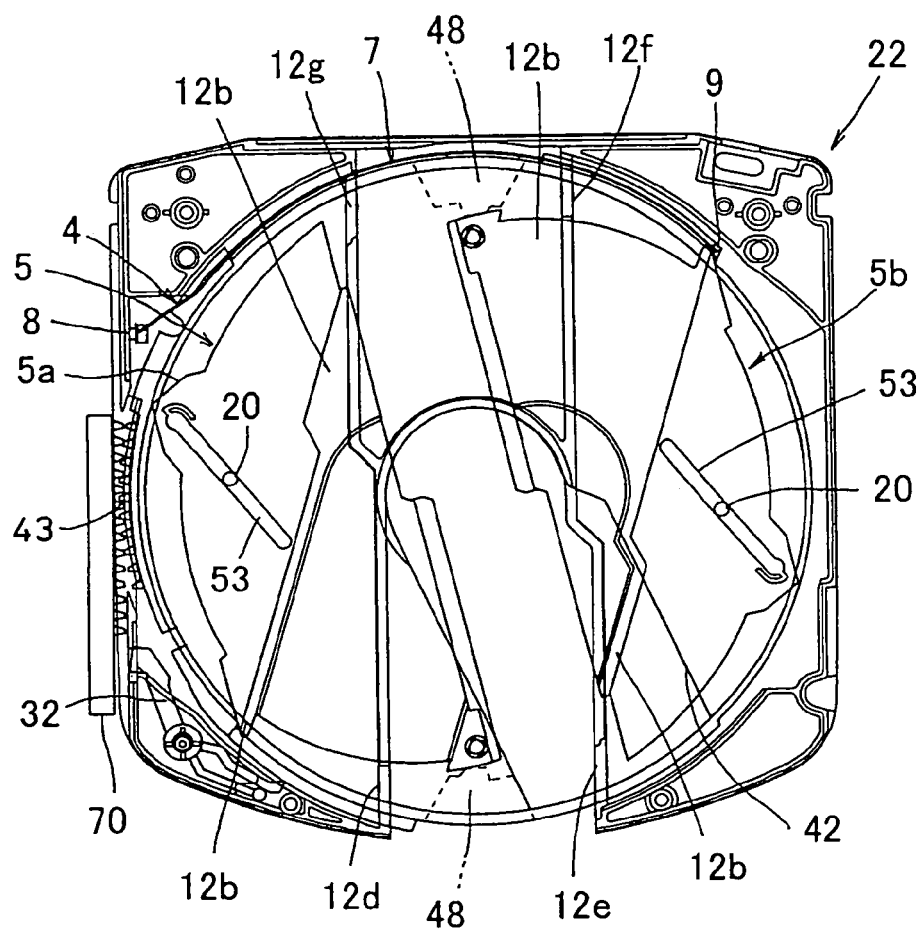
FIG. 25 is an explanatory view showing a state in which the inner rotor is further rotated from the state shown in FIG. 24 so that the pair of shutter members is further opened.
Figure 26:
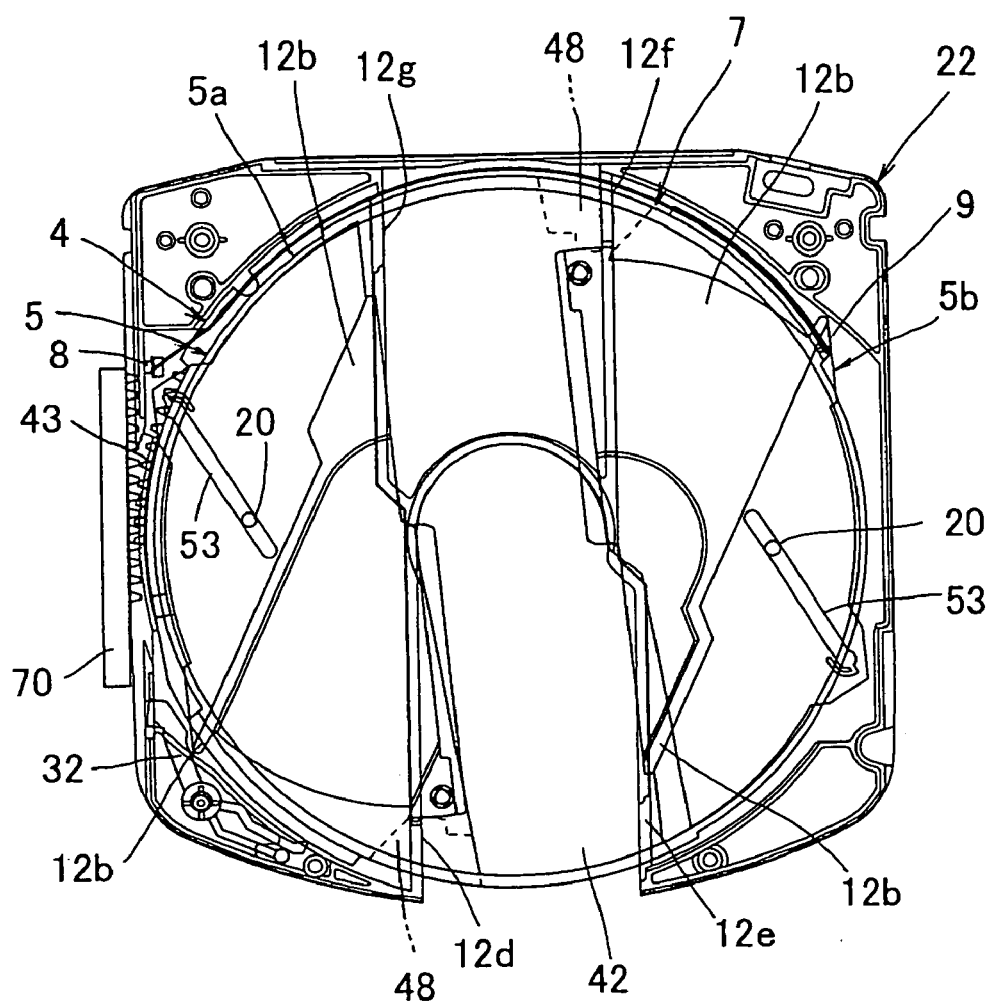
FIG. 26 is an explanatory view showing a state in which the inner rotor is further rotated from the state shown in FIG. 25 so that the pair of shutter members is further opened.
Figure 27:
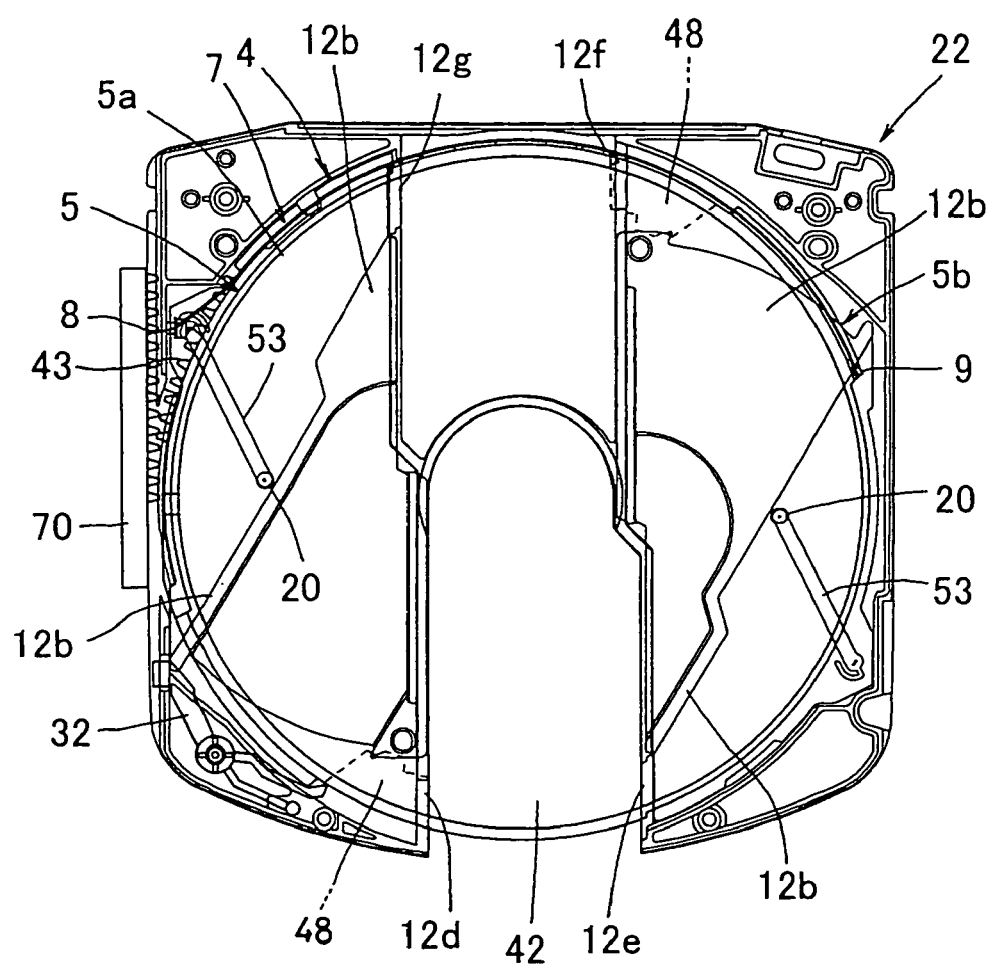
FIG. 27 is an explanatory view showing a state in which the inner rotor is further rotated from the state shown in FIG. 26 so that the pair of shutter members is completely opened.

The pair of the boss shaped protruding parts 20 and 20 are provided in the lower shell 22 and do not move. On the other hand, the slots 53 are extended in the direction S for connecting the shaft receiving holes 52 to the boss shaped protruding parts 20 so that the slots can move relative to the boss shaped protruding parts 20 and 20 following the rotation of the shutter member 5*a* and 5*b*. Thus, the boss shaped protruding parts 20 and 20 move relatively in the slots 53 toward the shaft receiving holes 52 depending on the amount of rotation of the shutter members 5*a* and 5*b*. Accordingly, in each of the shutter members 5*a* and 5*b*, the shaft receiving hole 52 moves to the corresponding boss shaped protruding part 20. As a result, from a state shown in FIG. 23, the shutter members 5*a* and 5*b* respectively move to both the side parts of the opening part 42 of the inner rotor 4, as shown in FIG. 27, via states shown in FIGS. 24, 25 and 26. Thus, the upper and lower opening parts 6 and 42 are completely opened. Accordingly, a part of the optical disc 3 accommodated in the disc accommodating part is exposed by the opening parts 6 and 42. Then, the information signal is reproduced or recorded by the recording and reproducing device main body 62.

After the information signal is reproduced or recorded, a cartridge ejection button (not shown) provided in the disc recording and reproducing device 60 is operated to eject the recording medium cartridge 1 from the disc recording and reproducing device 60.

When the recording medium cartridge 1 is ejected, the inner rotor 4 is rotated in the direction reverse to that upon inserting the cartridge 1 into the disc recording and reproducing device 60 by the accumulated resilient force of the coil spring 7 to automatically close the shutter 5. Accordingly, upon ejecting the recording medium cartridge 1, the gear part 70*a* of the rack rod 70 of the shutter opening and closing mechanism of the disc recording and reproducing device 60 does not need to be engaged with the gear part 43 of the inner rotor 4 to rotate the inner rotor 4. Therefore, the ejecting operation of the recording medium cartridge 1 can be carried out simply and rapidly and abrasion of the gear part 43 of the inner rotor 4 can be prevented.

(7) Other Embodiments

Figure 28:
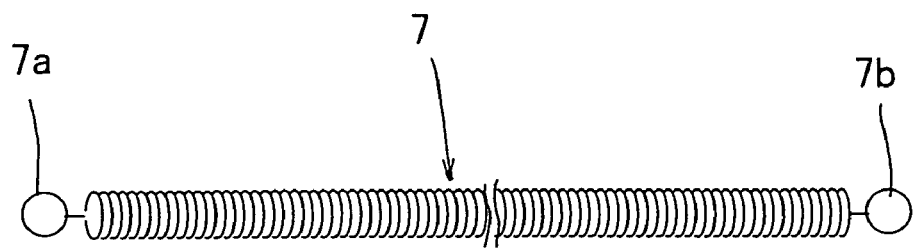
FIG. 28 is a perspective view of another embodiment of a shutter spring.
Figure 29:
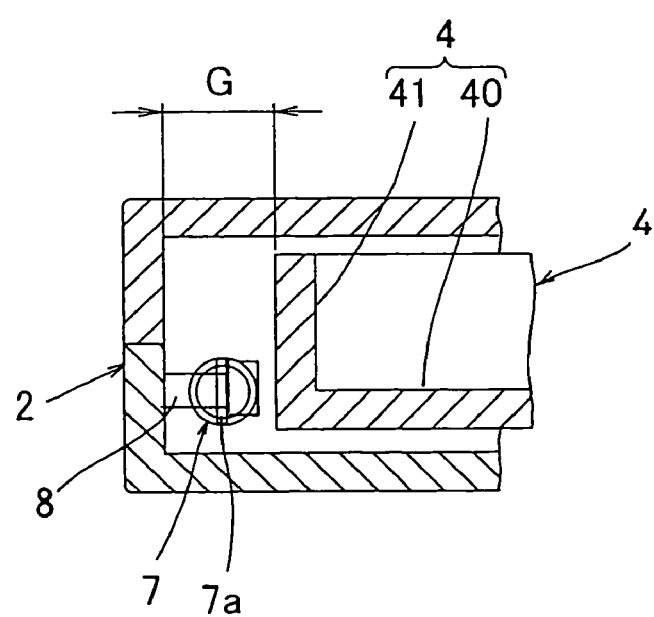
FIG. 29 is a sectional view showing another attaching example of a shutter spring.
Figure 30:
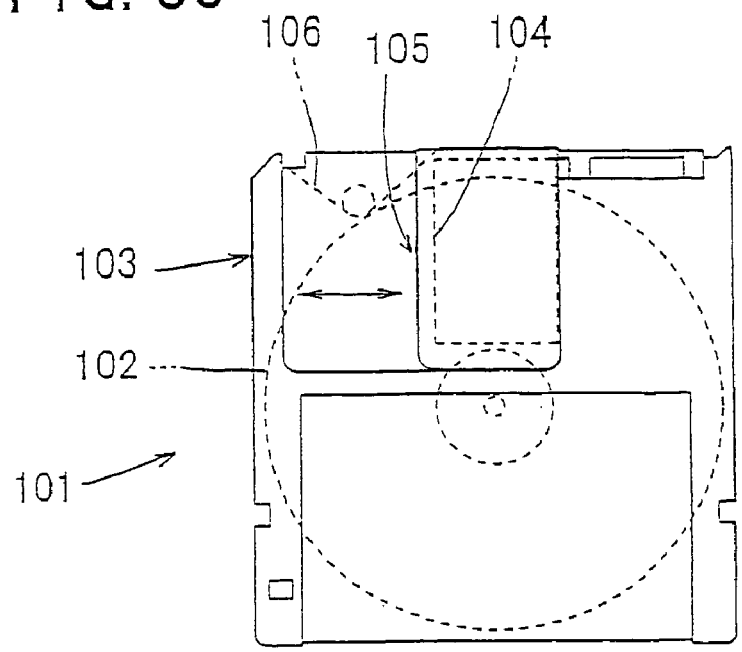
FIG. 30 is a plan view of a conventional example.
Figure 31:
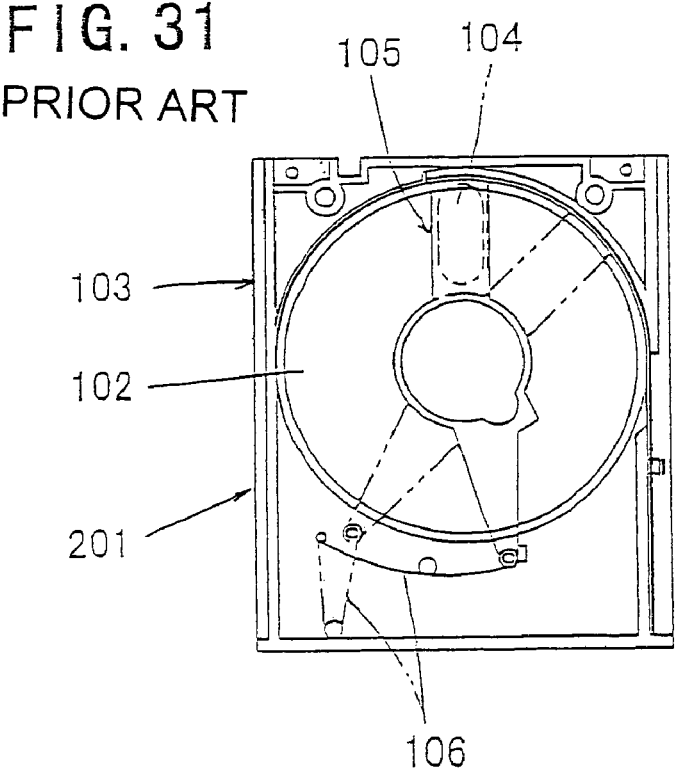
FIG. 31 is a plan view of another conventional example.

In the above-described embodiment, although an example in which a circular arc shaped extension coil spring is used as the coil spring 7 is described, the coil spring 7 may be a straight line shaped spring, as shown in FIG. 28. Further, the coil spring 7 may not be the extension coil spring and may be a compression coil spring. Further, in the above-described embodiment, as shown in FIG. 11, the coil spring attaching part 4*a* is formed by recessing the end part of the flat surface part 40 on the outer peripheral surface 4*b* of the rib part 41 of the inner rotor 4 in an annular form, and when the coil spring 7 is attached to the coil spring attaching part, the outer peripheral part 7*a* of the coil spring 7 is prevented from protruding from the outer peripheral surface 4*b* of the rib part 41 of the inner rotor 4 to interfere with the cartridge casing 2. However, as shown in FIG. 29, a space G between the inner rotor 4 and the cartridge casing 2 may be adequately provided so that the outer peripheral part 7*a* of the coil spring 7 does not come into contact with the inner surface of the cartridge casing 2.

INDUSTRIAL APPLICABILITY

The present invention can be widely applied to not only optical disc cartridges but also to magnetic disc cartridges and magneto-optical disc cartridges for CD, etc.

The invention claimed is:

1. A recording medium cartridge comprising:
    a cartridge casing composed of upper and lower shells having an information recording medium, an inner rotor and a shutter accommodated therein and operably connected to the inner rotor, the shutter having a pair of movable shutter members contacting each other in a closed position and disposed apart from one another in an opened position,
    a recording/reproducing opening part for allowing one part of the information recording medium to diametrically face at least one shell of the upper and lower shells of the cartridge casing; and
    a central opening part for driving the information recording medium, the inner rotor being rotated in one direction to drive the shutter and open the recording/reproducing opening part and the central opening part, wherein the shutter is driven from a position where the recording/reproducing opening part and the central opening part are opened and the pair of shutter members are in the opened position to a position where the recording/reproducing opening part and the central opening part are closed and the pair of shutter members are in a closed position by returning and rotating the inner rotor to the other direction by an extension coil spring or a compression coil spring.

2. The recording medium cartridge according to claim 1, wherein the extension coil spring or the compression coil spring is arranged so as to be wound on the outer peripheral part of the inner rotor, one end part is engaged with the inner rotor and the other end part is engaged with the cartridge casing.

3. The recording medium cartridge according to claim 1, wherein the extension coil spring or the compression coil spring has a wire diameter of no greater than 0.2 mm and a coil diameter of no greater than 1.5 mm.

4. The recording medium cartridge according to claim 1, wherein the extension coil spring or the compression coil spring is formed in a curved form corresponding to the curvature of the outer peripheral part of the inner rotor.

5. The recording medium cartridge according to claim 1, wherein when the recording medium cartridge is inserted into a disc recording and reproducing device, the inner rotor is rotated against the resilient force of the coil spring by a shutter opening mechanism provided in the disc recording and reproducing device to move the pair of shutter members of the shutter to the opened position where the opening parts provided in the cartridge casing are opened.

6. The recording medium cartridge according to claim 1, wherein the coil spring attaching part is formed by recessing the end part of a ring side of the outer peripheral surface of the inner rotor in an annular form so that the outer peripheral part of the attached coil spring maintains a non-contact state with the cartridge casing.

7. A recording medium cartridge comprising:
- a cartridge casing composed of upper and lower shells having an information recording medium, an inner rotor and a shutter accommodated therein,
- a recording/reproducing opening part for allowing one part of the information recording medium to diametrically face at least one shell of the upper and lower shells of the cartridge casing; and
- a central opening part for driving the information recording medium, the inner rotor being rotated in one direction to drive the shutter and open the recording/reproducing opening part and the central opening part, wherein the shutter is driven from a position where the recording/reproducing opening part and the central opening part are opened to a position where the recording/reproducing opening part and the central opening part are closed by returning and rotating the inner rotor to the other direction by an extension coil spring or a compression coil spring,
- wherein an engaging part at one end of the coil spring is engaged with a boss shaped spring engaging part protruding on the inner surface of the cartridge casing and an end part of the spring engaging part is provided with an engaging part slip preventing flange part for preventing the engaging part at one end of the engaged coil spring from slipping from the spring engaging part.

8. A recording medium cartridge comprising:
- a cartridge casing composed of upper and lower shells having an information recording medium, an inner rotor and a shutter accommodated therein,
- a recording/reproducing opening part for allowing one part of the information recording medium to diametrically face at least one shell of the upper and lower shells of the cartridge casing; and
- a central opening part for driving the information recording medium, the inner rotor being rotated in one direction to drive the shutter and open the recording/reproducing opening part and the central opening part, wherein the shutter is driven from a position where the recording/reproducing opening part and the central opening part are opened to a position where the recording/reproducing opening part and the central opening part are closed by returning and rotating the inner rotor to the other direction by an extension coil spring or a compression coil spring,
- wherein an engaging part at the other end of the coil spring is engaged with a hook shaped spring engaging part provided in a coil spring attaching part of the inner rotor.

* * * * *